(12) United States Patent
Newberg et al.

(10) Patent No.: US 8,867,388 B2
(45) Date of Patent: Oct. 21, 2014

(54) DISTRIBUTING CONTENT TO A PLURALITY OF MOBILE STATIONS USING A DOWNLINK POINT-TO-MULTIPOINT (PTM) BEARERS AND DOWNLINK POINT-TO-POINT (PTP) BEARERS

(75) Inventors: Donald G. Newberg, Hoffman Estates, IL (US); Michael F. Korus, Eden Prairie, MN (US); Valentin Oprescu-Surcobe, Northbrook, IL (US)

(73) Assignee: Motorola Solutions, Inc., Schaumburg, IL (US)

( * ) Notice: Subject to any disclaimer, the term of this patent is extended or adjusted under 35 U.S.C. 154(b) by 98 days.

(21) Appl. No.: 13/300,563

(22) Filed: Nov. 19, 2011

(65) Prior Publication Data

US 2013/0128796 A1      May 23, 2013

(51) Int. Cl.
*H04W 92/14*      (2009.01)
*H04L 1/00*      (2006.01)

(52) U.S. Cl.
CPC .................... *H04L 1/0003* (2013.01)
USPC ......................................... 370/252; 370/312

(58) Field of Classification Search
USPC ........................................................ 370/312
See application file for complete search history.

(56) References Cited

U.S. PATENT DOCUMENTS

| | | | |
|---|---|---|---|
| 6,775,242 B2 | 8/2004 | Grilli et al. | |
| 7,085,575 B2 | 8/2006 | Fabien et al. | |
| 7,096,013 B1 | 8/2006 | Randai et al. | |
| 7,738,423 B2 | 6/2010 | Khan | |
| 7,995,510 B2 | 8/2011 | Gao | |
| 8,098,590 B2 | 1/2012 | Catovic et al. | |
| 2003/0211859 A1 | 11/2003 | Chen et al. | |
| 2004/0131026 A1 | 7/2004 | Kim et al. | |
| 2005/0037767 A1* | 2/2005 | Kim et al. | 455/450 |
| 2006/0034202 A1 | 2/2006 | Kuure et al. | |
| 2007/0117579 A1* | 5/2007 | Cai et al. | 455/509 |
| 2007/0153727 A1 | 7/2007 | McBeath et al. | |

(Continued)

FOREIGN PATENT DOCUMENTS

| | | |
|---|---|---|
| CN | 101325791 A | 12/2008 |
| EP | 1581014 A1 | 9/2005 |

(Continued)

OTHER PUBLICATIONS

ETSI TS 136 440 v10.10; (Technical specification)—LTE; Evolved Universal Terrestrial Radio Access Network (E-UTRAN); General aspects and principles for interfaces supporting Multimedia Broadcast Multicast Service (MBMS) within E-UTRAN (3GGP TS 36.440, version 10.1.0 Release 10)—Jun. 2011.

(Continued)

*Primary Examiner* — Chirag Shah
*Assistant Examiner* — Rina Pancholi
(74) *Attorney, Agent, or Firm* — Steven A. May

(57) ABSTRACT

A method and apparatus is provided for distributing content to a plurality of mobile stations using a downlink point-to-multipoint (PTM) bearers and downlink point-to-point (PTP) bearers. A controller can process events, to determine whether a current modulation-and-coding scheme (MCS) level applied to downlink transmissions over the downlink PTM bearer is to be changed or maintained, and to communicate a change message whenever the current MCS level is to be changed. An actuator can adjust, in response to receiving a change message, a MCS level that is applied to downlink transmissions over the downlink PTM bearer.

29 Claims, 7 Drawing Sheets

(56) References Cited

U.S. PATENT DOCUMENTS

| | | | |
|---|---|---|---|
| 2007/0264992 A1 | 11/2007 | Maenpaa | |
| 2007/0281722 A1 | 12/2007 | Gao | |
| 2008/0102811 A1 | 5/2008 | Amirjoo et al. | |
| 2008/0212583 A1 | 9/2008 | Rey et al. | |
| 2008/0267109 A1* | 10/2008 | Wang et al. | 370/312 |
| 2008/0311892 A1 | 12/2008 | Lee et al. | |
| 2008/0316952 A1* | 12/2008 | Gruber et al. | 370/312 |
| 2009/0080363 A1 | 3/2009 | Bongyong et al. | |
| 2009/0103466 A1 | 4/2009 | Gu et al. | |
| 2009/0113487 A1 | 4/2009 | Nanjunda Swamy | |
| 2009/0170509 A1* | 7/2009 | Cai et al. | 455/434 |
| 2009/0196213 A1 | 8/2009 | Zhong et al. | |
| 2009/0207773 A1 | 8/2009 | Feng et al. | |
| 2009/0245155 A1 | 10/2009 | Fukunaga et al. | |
| 2009/0303909 A1 | 12/2009 | Farhoudi et al. | |
| 2009/0323638 A1 | 12/2009 | Catovic et al. | |
| 2010/0027541 A1 | 2/2010 | Eriksson et al. | |
| 2010/0061308 A1 | 3/2010 | Becker et al. | |
| 2010/0081451 A1 | 4/2010 | Mueck et al. | |
| 2010/0128649 A1 | 5/2010 | Gonsa et al. | |
| 2010/0157969 A1 | 6/2010 | Swamy et al. | |
| 2010/0172281 A1 | 7/2010 | Hus et al. | |
| 2010/0197265 A1 | 8/2010 | Dorenbosch et al. | |
| 2010/0222055 A1 | 9/2010 | Cho et al. | |
| 2010/0232340 A1 | 9/2010 | Godar et al. | |
| 2010/0265867 A1 | 10/2010 | Becker et al. | |
| 2010/0302988 A1 | 12/2010 | Becker | |
| 2011/0077006 A1 | 3/2011 | Hsu | |
| 2011/0145846 A1 | 6/2011 | Kim | |
| 2011/0159880 A1 | 6/2011 | Kumar et al. | |
| 2011/0255460 A1* | 10/2011 | Lohmar et al. | 370/312 |
| 2011/0305183 A1 | 12/2011 | Hsu et al. | |
| 2011/0305184 A1 | 12/2011 | Hsu | |
| 2012/0008525 A1 | 1/2012 | Koskinen | |
| 2012/0014264 A1 | 1/2012 | Wang | |
| 2012/0033623 A1 | 2/2012 | Chu et al. | |
| 2012/0172028 A1 | 7/2012 | Korus et al. | |
| 2012/0230240 A1 | 9/2012 | Nebat et al. | |
| 2013/0128797 A1 | 5/2013 | Newberg et al. | |

FOREIGN PATENT DOCUMENTS

| | | | |
|---|---|---|---|
| EP | 1986365 A1 | 10/2008 | |
| EP | 2007151 A1 | 12/2008 | |
| EP | 2146515 A1 | 1/2010 | |
| WO | 02/089501 A1 | 11/2002 | |
| WO | 03/098871 A1 | 11/2003 | |
| WO | 2006027006 A1 | 3/2006 | |
| WO | 2008123824 A2 | 10/2008 | |
| WO | 2010001928 A1 | 7/2010 | |
| WO | 2011000947 A1 | 1/2011 | |
| WO | 2011068421 A1 | 6/2011 | |

OTHER PUBLICATIONS

3GPP TS 36.213 v8.80; (Technical specification)—3rd Generation Partnership Project; Technical Specification Group Radio Access Network; Evolved Universal Terrestrial Radio Access (E-UTRA); Physical layer procedure (Release 8)—Sep. 2009.

3GPP TS 36.440 v9.1.0 (Technical Specification)—3rd Generation Partnership Project; Technical Specification Group Radio Access Network; Evolved Universal Terrestrial Radio Access Network (E-UTRA); General aspects and principles for interfaces supporting Multimedia Broadcast Multicast Service (MBMS) within E-UTRAN (Release 9)—Mar. 2010.

PCT International Search Report mailed mailed May 10, 2013 in counterpart PCT International Application No. PCT/US2012/062592.

Non Final Office Action mailed Jun. 21, 2013 in U.S. Appl. No. 13/300,566, Donald G. Newberg, filed Nov. 19, 2011.

Notice of Allowance mailed Dec. 11, 2013 in U.S. Appl. No. 13/300,566, Donald G. Newberg, filed Nov. 19, 2011.

Notice of Allowance mailed Jan. 13, 2014 in U.S. Appl. No. No. 13/300,566, Donald G. Newberg, filed Nov. 19, 2011.

LTE—3GPP TS 36.300 V10.0.0—3rd Generation Partnership Project; Technical Specification Group Access Network; Evolved Universal Terrestrial Radio Access (E-UTRA) and Evolved Universal Terrestrial Radio Access Netwotk (E-UTRAN); Overall description; Stage 2 (Release 10)—Dated Jun. 2010—Copyright 2010.

"Multimedia Broadcast and Multicast Services in 3G Mobile Netowrks," Alcatel Telecommunications Revenues, pp. 1-12, Apr. 1, 2004.

3GPP TS 23.246 V.9.5.0; 3rd Generation Partnership Project; Technical Specification Group Services and System Aspects; Multimedia Broadcast/Multicast Service (MBMS); Architecture and Functional Description, Release 9; Sections 4.4.3, 4.4.4, and 8; Jun. 2010.

3GPP TS 26.346 V.9.4.0; "3rd Generation Partnership Project; Technical Specification Group Services and System Aspects; Multimedia Broadcast/Multicast Service (MBMS); Protocols and Codecs, Release 9"; Sections 5.4.1 and 8; Sep. 2010.

3GPP TSG RAN WG3 #59bis "E-MBS Functions of Statistical Multiplexing"; R2-074339; Oct. 8-12, 2007; Shanghai, China, 8 Pages.

3rd Generation Partnership Project (3GPP), "3GPP TS 26.246 V9.0.0: Technical Specification Group Services and System Aspects; Transparent end-to-end packet switched streaming service (PSS); 3GPP SMIL Language Profile (Release 9)," 3GPP Standard, pp. 1-17, Dec. 10, 2009.

Final Office Action mailed Apr. 15, 2013 in related U.S. Appl. No. 12/981,226, filed on Dec. 29, 2010.

Final Office Action mailed Apr. 25, 2013 in U.S. Appl. No. 12/981,323, Michael F. Korus, filed Dec. 29, 2010.

International Search Report and Written Opinion for counterpart International Patent Application No. PCT/US2011/066705 mailed on Jan. 18, 2013.

International Search Report and Written Opinion for related counterpart International Patent Application No. PCT/US2011/067354 mailed on Mar. 21, 2012.

International Search Report and Written Opinion for related counterpart International Patent Application No. PCT/US2011/066709 mailed on Jul. 6, 2012.

International Search Report and Written Opinion for related counterpart International Patent Application No. PCT/US2011/053051 mailed on Nov. 25, 2011.

Non Final Office Action mailed Jun. 4, 2014 in U.S. Appl. No. 12/981,323, Michael F. Korus, filed Dec. 29, 2010.

Non Final Office Action mailed Oct. 26, 2012 in related U.S. Appl. No. 12/981,226, filed on Dec. 29, 2010.

Non Final Office Action mailed Oct. 26, 2012 in U.S. Appl. No. 12/981,323, Michael F. Korus, filed Dec. 29, 2010.

Non Final Rejection mailed Mar. 1, 2013 in related U.S. Appl. No. 12/981,274, Michael F. Korus, filed Dec. 29, 2010.

Open Mobile Alliance Standard "OMA-TS-PoC_MUL TICAST PoC-V2.1-20091222-C"; Dec. 22, 2009; Sections 6 and 7; pp. 23-27.

Open Mobile Alliance: "OMA PoC Control Plane Approved Version 1.0.3," OMA-TS-PoC_ControiPiane-V1_0_3-20090922-A, pp. 1-8, Sep. 22, 2009.

Open Mobile Alliance: "Poe User Plane Approved Version 1.0.3," OMA-TS-PoC_UserPiane-V1_0_3-20090922-A, pp. 1-12, Sep. 22, 2009.

Rosenberg, J. et al., "SIP: Session Initiation Protocol," RFC 3261, Network Working Group Request for Comments, pp. 14, Jun. 1, 2002.

* cited by examiner

DISTRIBUTING CONTENT TO A PLURALITY OF MOBILE STATIONS USING A DOWNLINK POINT-TO-MULTIPOINT (PTM) BEARERS AND DOWNLINK POINT-TO-POINT (PTP) BEARERS

RELATED APPLICATIONS

The present application is related to the following United States patent application, commonly owned and filed of even date herewith, with this application by Motorola Solutions, Inc.: Ser. No. 13/300,566, filed Nov. 19, 2011, titled "DYNAMICALLY SWITCHING MOBILE STATIONS BETWEEN POINT-TO-POINT AND POINT-TO-MULTI-POINT OPERATING MODES", the entire contents of which are incorporated herein by reference.

FIELD OF THE DISCLOSURE

The present disclosure relates generally to communication systems and more particularly to methods, systems and apparatus for distributing content to a plurality of mobile stations.

BACKGROUND

Long Term Evolution (LTE) is a radio technology designed to increase the capacity and speed of mobile telephone networks and provide for an end-to-end Internet Protocol (IP) service delivery of media to help support the demands for multimedia services that are already experienced in wired networks. Currently, LTE comprises a set of enhancements to the Universal Mobile Telecommunications System (UMTS), which is described in a suite of Technical Specifications (TS) developed within and publicized by Third ($3^{rd}$) Generation Partnership Project (3GPP). Copies of the 3GPP TSs can be obtained online at http://www.3gpp.org/specifications, or by writing to 3GPP Mobile Competence Centre (c/o ETSI), 650, route des Lucioles, 06921 Sophia-Antipolis Cedex, FRANCE.

LTE, in part, provides for a flat Internet Protocol (IP)-based network architecture designed to ensure support for, and mobility between, some legacy or non-3GPP systems such as, for instance, GPRS (general packet radio service) and WiMAX (Worldwide Interoperability for Microwave Access). Some of the main advantages of LTE are high throughput, low latency, plug and play, FDD (frequency-division duplex) and TDD (time-division duplex) in the same platform, improved end user experience, simple architecture resulting in low operating costs, and interoperability with older standard wireless technologies such as GSM (Global Systems for Mobile Communications), cdmaOne, W-CDMA (UMTS), and CDMA2000. Many major carriers have started to support LTE in their networks.

LTE and other 3GPP compliant systems (meaning systems having elements that operate in compliance with 3GPP TSs) also provide Multimedia Broadcast/Multicast Service (MBMS) point-to-multipoint (PTM) transport of media to User Equipment (UEs) operating on the system.

To support MBMS, LTE offers functionality to transmit MBMS over a Single Frequency Network (MBSFN), where a time-synchronized common waveform is transmitted from multiple cells for a given duration.

The locations of UEs within MBSFN areas can vary. To help ensure that all UEs can properly decode radio frequency (RF) signals received from enhanced Node Bs (eNodeBs) (and thus help achieve good RF reception by all UEs that should receive the service), the eNodeBs can be configured to transmit at a low modulation and coding scheme (MCS) level, where the semantics and for the MCS level are defined in 3GPP TS 36.213 "Evolved Universal Terrestrial Radio Access (E-UTRA); Physical layer procedures." To be able to properly decode received RF signals, a UE in a harder RF environment will need to receive RF signals that were modulated and coded at a lower MCS level than a UE in a better RF environment. Unfortunately, always using a low MCS level may unnecessarily consume an undue amount of RF resources. For example, in some cases it may be possible to transmit at a higher MCS level and still achieve adequate reception by all UEs within MBSFN areas that are to receive MBMS.

Accordingly, there is a need for improvements to the MBMS mechanisms that are currently used in conjunction with 3GPP compliant systems. It would be desirable to provide methods, systems and apparatus that can help reduce resource utilization, while at the same time ensuring that all the UEs are able to receive properly decode the received RF signals. It would be desirable if such methods, systems and apparatus were easy to implement using communication systems such as those that implement existing LTE infrastructure in a way that does not impact the UE or existing standards.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
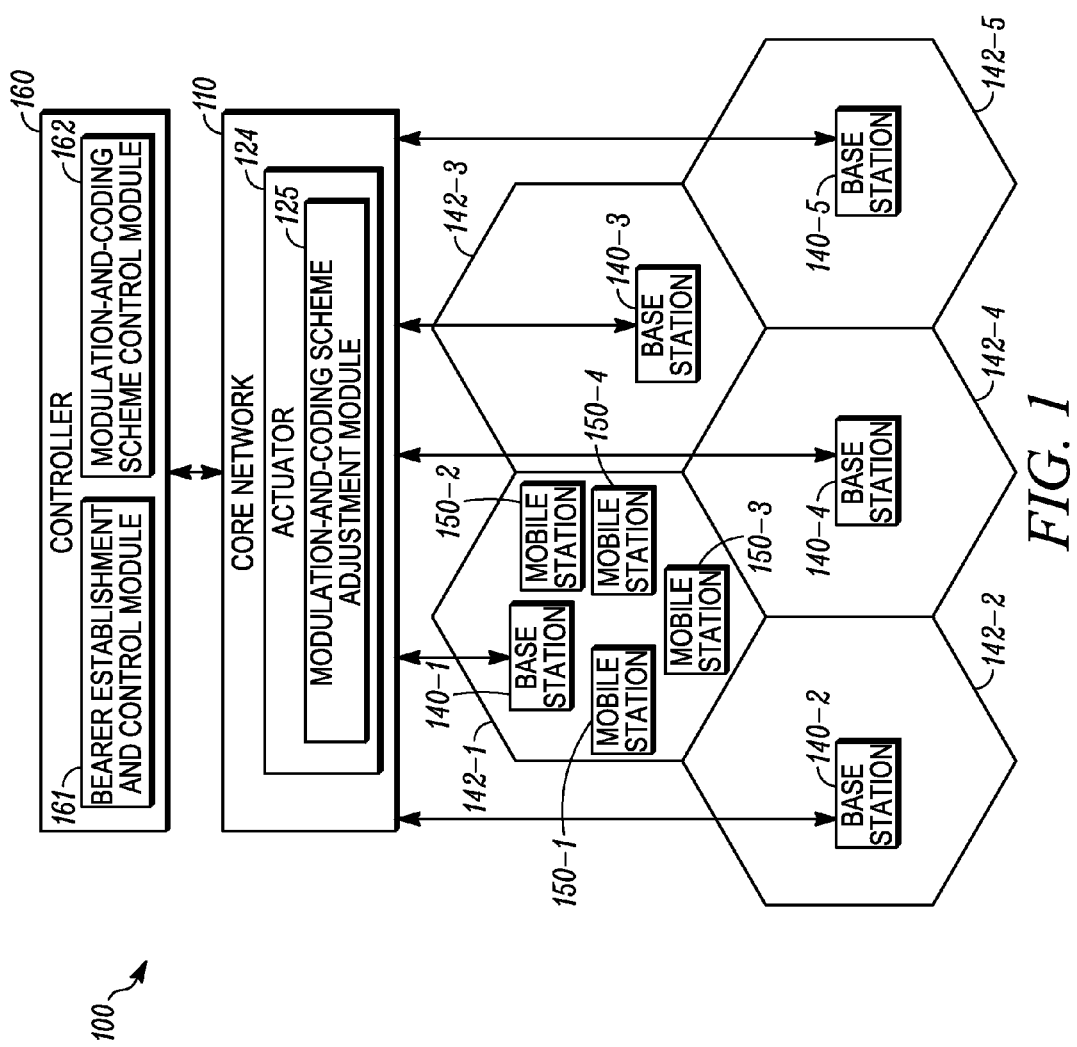
FIG. 1 is a block diagram illustrating a communication system in which some of the disclosed embodiments can be implemented.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

FIG. 1 is a block diagram of a communication system 100 in which some of the disclosed embodiments can be implemented.

The communication system 100 includes a core network 110, a group of base stations 140-1 . . . 140-5, a group of mobile stations (MSs) 150-1 . . . 150-4, and a controller 160. The core network 110 includes an actuator 124. The base stations 140 are part of a Radio Access Network (RAN). The disclosed embodiments can generally apply in the context of any type of radio access network, including any fourth generation (4G) type radio access networks (e.g. LTE Evolved Universal Terrestrial Radio Access Network (E-UTRAN), Worldwide Interoperability for Microwave Access (WiMAX) radio access network).

In general, the core network 110 (and its various logical entities or devices), base stations 140-1 . . . 140-5, mobile stations 150-1 . . . 150-4, the actuator 124 and the controller 160 are each implemented using (although not shown) a memory, one or more network interfaces, and a computer or processor that are operatively coupled, and which when programmed form the means for these system elements to implement their desired functionality that will be described below. The network interfaces are used for passing signaling, also referred to herein as messaging (e.g., messages, packets, datagrams, frames, superframes, and the like) between the elements of the communication system 100. The implementation of the network interface in any particular element depends on the particular type of network, i.e., wired and/or wireless, to which the element is connected.

Where the network supports wireless communications, the interfaces comprise elements including processing, modulating, and transceiver elements that are operable in accordance with any one or more standard or proprietary wireless over-the-air interfaces. Some of the functionality of the processing, modulating, and transceiver elements may be performed by means of the processing device through programmed logic such as software applications or firmware stored on the memory device of the system element or through hardware.

The computer processors utilized by the core network 110 (and its various logical entities or devices including the actuator 124), base stations 140-1 . . . 140-5, mobile stations 150-1 . . . 150-4, and the controller 160 may be programmed with software or firmware logic or code for performing functionality described below by reference to the drawings that will be described below; and/or the processing device may be implemented in hardware, for example, as a state machine or ASIC (application specific integrated circuit) to perform such functionality. The memory implemented by these system elements can include short-term and/or long-term storage of various information needed for the functioning of the respective elements. The memory may further store software or firmware for programming the processing device with the logic or code needed to perform its functionality.

A brief overview description of some of the functionality of the core network 110 (and its various logical entities or devices), base stations 140-1 . . . 140-5, mobile stations 150-1 . . . 150-4, and the controller 160 shown in FIG. 1 will now be provided.

The controller 160 includes a processor that implements a bearer establishment and control module 161 that performs processing to determine when PTM and PTP bearers should be established towards various mobile stations, and a Modulation and Coding Scheme (MCS) control module 162 that can perform processing in order to determine when the MCS level applied to downlink transmissions over a PTM bearer should be adjusted. As used herein, the term controller refers to a server, computer or other device, such as an Application Server, which is designed to perform processing in order to determine, among other things, when an MCS level applied to downlink transmissions over a PTM bearer should be adjusted. The controller may also perform processing to determine when PTM and PTP bearers should be established towards various mobile stations. As used herein, the term "bearer" refers to a logical transmission path or link established between two points for PTP bearers, and between one point and one or more points for PTM bearers.

The core network 110 includes an actuator 124. As used herein, an actuator refers to a module implemented at an infrastructure device, which is designed to be able to set and change the MCS level applied to downlink transmissions over PTM bearers. In this embodiment, the actuator 124 includes a computer processor that is capable of implementing a Modulation and Coding Scheme (MCS) adjustment module 125 that is able to set and change the MCS level applied to downlink transmissions over PTM bearers. The actuator 124 may work under the command of a controller 160, but it may also autonomously exercise some of the controller 160 functionality described above.

As is well-known in the art, each of the mobile stations 150 includes at least one transmitter, at least one receiver, and at least one processor for performing the functionality described below. Furthermore, each of the mobile stations 150 is designed to operate in a point-to-point (PTP) operating mode and/or a point-to-multipoint (PTM) operating mode at any given time, and the remainder of the system 110 can be used for distributing content to each of the mobile stations 150 using a downlink point-to-multipoint (PTM) bearer and downlink point-to-point (PTP) bearers.

When operating in PTM operating mode, each mobile station 500 can receive information over a downlink PTM bearer. As will be appreciated by those skilled in the art, transmission over the downlink PTM bearer can either be (1) not received at all by a mobile station (i.e., inadequate), (2) received by the mobile station but not be decodable (i.e., inadequate), or (3) received by the mobile station and decodable (i.e., adequate). A processor at each of the mobile stations 150 can determine whether reception of information over the downlink PTM bearer is adequate or inadequate. For example, in one implementation, the processor can determine whether quality of the information received over the downlink PTM bearer is adequate or inadequate.

In one embodiment, each of the mobile stations 150 can determine that the reception over the downlink PTM bearer (e.g., the quality of the downlink transmission over the downlink PTM bearer) is inadequate when at least one of the following occurs: (1) the mobile station cannot detect a downlink transmission over the downlink PTM bearer, (2) the mobile station determines that the downlink PTM bearer is not transmitted at a current location of the mobile station, and/or (3) the mobile station decodes packets received over the downlink PTM bearer and determines that the number of decoding errors (e.g., that a number of the packets unrecoverable due to errors) is greater than a threshold. In one implementation, each of the mobile stations can determine that the downlink PTM bearer is not transmitted at the current location of the mobile station, when the mobile station determines, based on content of received signaling, that the downlink PTM bearer is not transmitted at its current location, or when the mobile station determines, based on pre-stored information, that the downlink PTM bearer is not transmitted at its current location.

I. Dynamically Switching Mobile Stations Between Point-to-Point (PTP) and Point-to-Multipoint (PTM) Operating Modes and Vice-Versa A. Complaint and/or Request Messages When any one of the mobile stations determines that the reception of the information over the downlink PTM bearer is inadequate (e.g., that the quality of a received downlink transmission over the downlink PTM bearer is inadequate), it can transmit or send the controller 160 one or more of a complaint message, or a request message. The complaint message can be sent to the controller 160 to indicate to the controller that the reception over the downlink PTM bearer is inadequate, whereas the request message can be sent to the controller 160 to indicate that the particular mobile station is requesting to switch from the PTM operating mode to the PTP operating mode. For example, in one implementation, when the mobile station is operating in a PTM operating mode and determines that the reception over the downlink PTM bearer has become inadequate, the mobile station can generate and transmit a request message to the controller 160 to switch to PTP operating mode. The request message indicates to the controller 160 that the reception over the downlink PTM bearer has become inadequate.

B. Signals and/or Instructions for Switching Operating Mode

In some embodiments, each mobile station can process a signal and/or instruction to switch to a PTP operating mode, or can process a signal and/or instruction to switch to a PTM operating mode. As used herein, the term "signal" can refer to an implicit signal in some implementations, or to an explicit signal in other implementations, and the term "instruction" can refer to an implicit instruction in some implementations, or to an explicit instruction in other implementations. The term "implicit signal" refers to a signal that is automatically interpreted at a recipient as communicating information even though the signal does not include any specific information. The term "explicit signal" refers to a signal that includes information that is processed and then interpreted at a recipient.

In some embodiments, an implicit signal will be communicated that includes an implicit instruction. For example, in one embodiment, the establishment of a bearer to a mobile station is an implicit signal or instruction that can trigger the switching to a PTP operating mode, or to a PTM operating mode.

In some embodiments, an explicit signal will be communicated that includes an explicit instruction. For example, in some embodiments, the infrastructure can send explicit signaling (e.g., application layer messaging) that includes an explicit instruction to switch operating mode. In other embodiments, the mobile station can self-generate an explicit instruction to switch its operating mode.

In embodiments that utilize an explicit instruction to switch, each mobile station can process the instruction and determine whether the instruction is to switch to a PTP operating mode, or to switch to a PTM operating mode. To explain further, when a mobile station processes the instruction, that mobile station will determine whether it is operating in the PTP operating mode or the PTM operating mode. In one embodiment, when the mobile station 150 determines that it is operating in the PTM operating mode and the instruction is to switch to the PTP operating mode, the mobile station switches from the PTM operating mode to the PTP operating mode, may optionally stop receiving over (or "listening on") the downlink PTM bearer, and starts receiving downlink transmissions over a downlink PTP bearer. By contrast, when the mobile station 150 determines that it is operating in the PTP operating mode and that the instruction is to switch to the PTM operating mode, the mobile station switches from the PTP operating mode to the PTM operating mode, may optionally stop receiving on the downlink PTP bearer, and starts receiving downlink transmissions over a downlink PTM bearer. In either scenario, the mobile station switches between operating modes in a manner that allows continued reception of media being communicated.

In accordance with some embodiments, the instruction can be either, self-generated by the mobile station 150, or generated outside the mobile station (e.g., generated at the application server 160 in response to the complaint message or a request message, and transmitted to the mobile station 150) and transmitted to the mobile station 150.

For example, in one implementation, in response to processing an event, the controller 160 can transmit a signal that includes an instruction for a particular mobile station to switch between the PTP operating mode and the PTM operating mode. In response to receiving the instruction in that signal, the particular mobile station 150 will switch to either the PTP operating mode or PTM operating mode as instructed by the controller 160.

For instance, when the controller 160 processes an event such as either receiving a complaint message or a request message to change an operating mode, the controller 160 can determine whether a particular mobile station 150 is operating in the PTM operating mode, and if so, can then determine whether the particular mobile station 150 is to be switched from the PTM operating mode to the PTP operating mode. When the controller 160 determines that the particular mobile station 150 is to be switched from the PTM operating mode to the PTP operating mode, the controller 160 can generate a signal that includes an instruction for the particular mobile station 150 to switch to the PTP operating mode, and transmit the signal to the particular mobile station 150.

By contrast, when the controller 160 determines that the particular mobile station 150 is operating in PTP mode, the controller 160 can determine whether the event is the reception of a request message from the mobile station 150 to switch to the PTM operating mode, and if so, the controller 160 can generate a signal that includes an instruction for the particular mobile station 150 to switch to the PTM operating mode, and transmit the signal to the particular mobile station 150.

II. Adjustment of Modulation-and-Coding Scheme (MCS) Level Applied to a Downlink PTM Bearer The controller 160 includes a processor that processes events to determine, based on the event, whether a current MCS level applied to downlink transmissions over a downlink PTM bearer is to be changed (e.g., incremented or decremented) or maintained.

The event processed at the controller 160 can include, for example, one or more of: (1) reception of a complaint message from any mobile station, (2) reception of a request message from any mobile station to change the operating mode of that particular mobile station 150 from either a PTP operating mode to a PTM operating mode, or vice-versa, (3) an indicator internally generated by the controller 160 when a first period of time has passed without receiving a complaint message from any mobile station, or (4) an indicator internally generated by the controller 160 when a second period of time has passed without receiving a request message from any mobile station 150.

Whenever the controller 160 determines that the current MCS level is to be changed, the controller 160 can communicate a change message to the actuator 124. Each change message can be either an increment message, or a decrement message.

A. Decrement and Increment Messages

For example, in one embodiment, when the controller 160 determines that the current MCS level is to be decremented, the controller 160 can communicate a decrement message that instructs the actuator to decrease the MCS level that is applied to the downlink transmissions over the downlink PTM bearer.

By contrast, when the controller 160 determines that the current MCS level is to be incremented, the controller 160 can communicate an increment message that instructs the actuator 124 to increase the MCS level that is being applied to the downlink transmissions over the downlink PTM bearer.

B. Actuator Adjustment of Modulation-and-Coding Scheme (MCS) Level

In response to receiving a change message (e.g., transmitted from the controller 160), the actuator 124 can adjust a MCS level that is applied to downlink transmissions over a downlink PTM bearer.

For example, in response to receiving a decrement message (from an outside source such as the controller 160), the actuator 124 decreases or decrements the current MCS level that is being applied to the downlink transmissions over the downlink PTM bearer. In one implementation, in response to a decrement message, the actuator 124 decreases or decrements the current MCS level that is being applied to the downlink transmissions over the downlink PTM bearer by a decrement amount only when the actuator 124 determines that the current MCS level is above a minimum threshold. The actuator 124 then applies a MCS at the decremented MCS level to the downlink PTM bearer.

By contrast, in response to an increment message (that can either be internally generated by the actuator 124 or received from an outside source such as the controller 160), the actuator 124 increases or increments the MCS level that is being applied to the downlink transmissions over the downlink PTM bearer. In one implementation, in response to an increment message, the actuator 124 increases or increments the current MCS level by an increment amount only when the current MCS level is below a maximum threshold. The actuator 124 then applies a MCS at the incremented MCS level to the downlink PTM bearer.

One specific implementation of some of the disclosed embodiments will now be described with reference to FIGS. 2 and 3 in which the communication system is an LTE communication system, and where the controller is implemented at an application server, and the actuator is implemented at a specific logical entity, called the Multi-cell/multicast Coordination Entity (MCE), within the LTE Evolved Packet Core (EPC).

Figure 2:
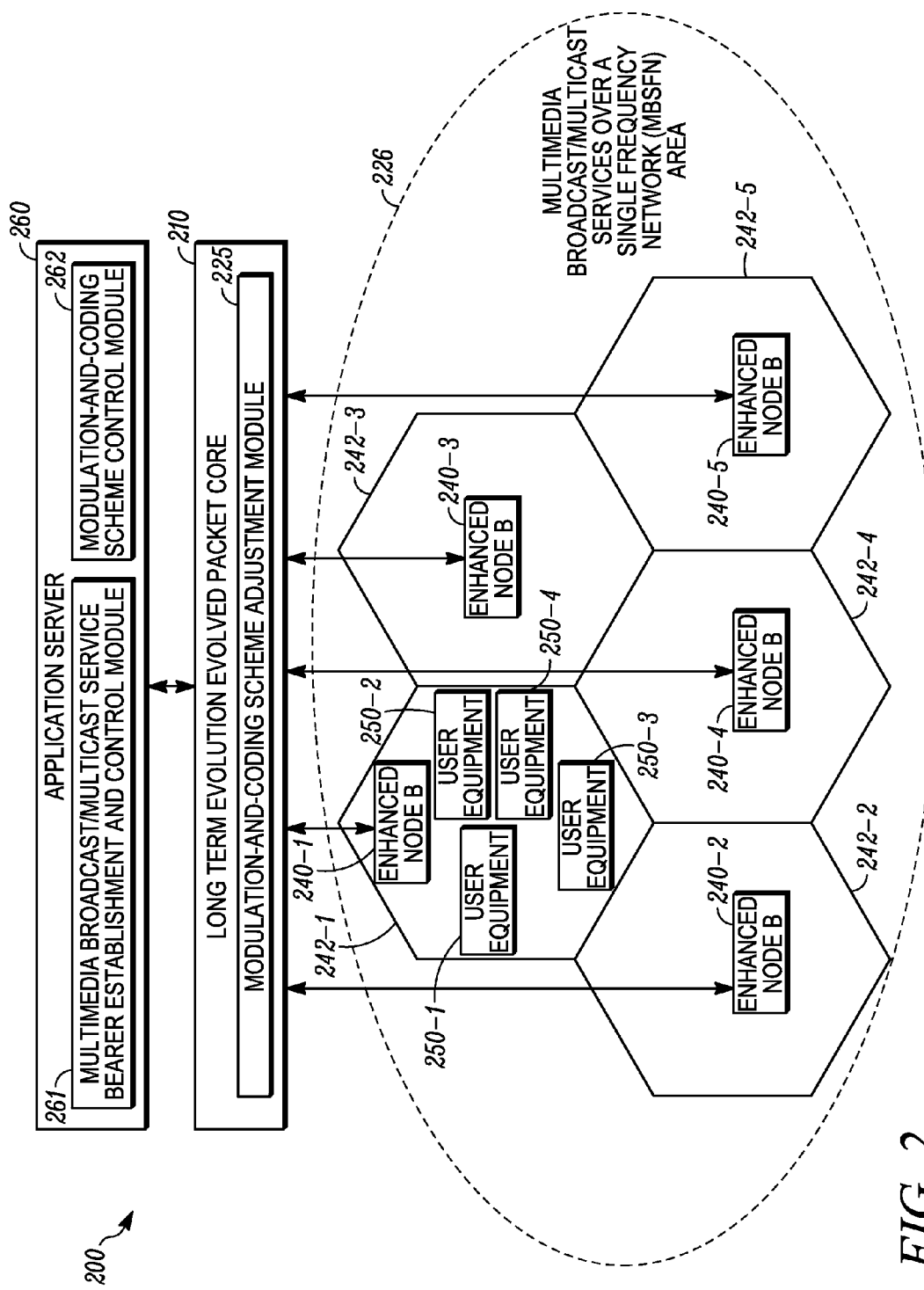
FIG. 2 is a block diagram illustrating a Long Term Evolution (LTE) communication system in which some of the disclosed embodiments can be implemented.

FIG. 2 is a block diagram of a Long Term Evolution (LTE) communication system 200 in which some embodiments can be implemented.

The communication system 200 includes an LTE Evolved Packet Core (EPC) 210, a plurality of LTE base stations called "eNodeBs" 240-1 . . . 240-5, a plurality of user equipment (UE) 250-1 . . . 250-4, and an application server 260. Together the UEs 250 and eNodeBs 240 make up an LTE Evolved Universal Terrestrial Radio Access Network (E-UTRAN)). In general, the EPC 210 and the E-UTRAN can be referred to collectively as an LTE system, LTE communication system, or Evolved Packet System (EPS) and can be referred to as such interchangeably herein. Also, it is noted that while, in this example, the radio access network is described as being a LTE E-UTRAN, some embodiments can apply in the context of other types of access networks, including fourth generation (4G) radio access networks such as a WiMAX radio access network.

As described in the 3GPP TSs, a RAN such as the LTE E-UTRAN can be partitioned into one or more MBMS service areas, with each MBMS service area covering a particular geographical area in which MBMS transmissions to the UEs can occur. A MBMS service area can be further partitioned into one or more MBSFN Areas each identified by a MBSFN Area identifier (ID). Further, each MBSFN Area 226 generally includes a plurality of cells 242. A cell 242 can be defined as being inclusive of a single eNodeB's coverage area or a portion of an eNodeB's coverage area and can be identified by a cell identifier. For sake of simplicity, FIG. 2 illustrates a single MBSFN Area 226 having five eNodeB coverage areas therein. Although not illustrated, each eNodeB coverage area can include three (3) cells for a total of fifteen cells (15) within the MBSFN Area 226 that is illustrated in FIG. 2. However, those skilled in the art will appreciate that the LTE EUTRAN can include a plurality of MBSFN Areas. The terms "MBMS service area" and "MBSFN area" are used interchangeably herein since, in the described embodiment, the MBMS service area and MBSFN area have a one-to-one correspondence. However, this is meant only to be illustrative and to provide a simple embodiment for ease of understanding, and is in no way meant to limit the scope of the present teachings. As such, the present teachings also apply to a logical partitioning of the LTE E-UTRAN where there is a one-to-many correspondence between the MBMS service area and MBSFN area.

It is noted that the UEs 250 and eNodeBs 240 (and any other E-UTRAN elements), the EPC 210 (and the various logical entities or devices that it includes), and the application server 260 implement protocols and signaling in compliance with 3GPP TSs (including, but not limited to, 3GPP TSs 26.346 and 23.246, which describe aspects of 3GPP MBMS).

In general, the EPC 210 (and its various logical entities or devices), eNodeBs 240-1 . . . 240-5, UEs 250-1 . . . 250-4, and the application server 260 are each implemented using (although not shown) a memory, one or more network interfaces, and a processing device that are operatively coupled, and which when programmed form the means for these system elements to implement their desired functionality, for example as illustrated by reference to the drawings that will be described below. The network interfaces are used for passing signaling, also referred to herein as messaging, (e.g., messages, packets, datagrams, frames, superframes, and the like) between the elements of the system 200. The implementation of the network interface in any particular element depends on the particular type of network, i.e., wired and/or wireless, to which the element is connected.

Where the network supports wireless communications, the interfaces comprise elements including processing, modulating, and transceiver elements that are operable in accordance with any one or more standard or proprietary wireless over-the-air interfaces. Some of the functionality of the processing, modulating, and transceiver elements may be performed by means of the processing device through programmed logic such as software applications or firmware stored on the memory device of the system element or through hardware.

The processors utilized by the EPC 210 (and its various logical entities or devices), eNodeBs 240-1 . . . 240-5, UEs 250-1 . . . 250-4, and the application server 260 may be programmed with software or firmware logic or code for performing functionality described by reference to the drawings that will be described below; and/or the processing device may be implemented in hardware, for example, as a state machine or ASIC (application specific integrated circuit) to perform such functionality. The memory implemented by these system elements can include short-term and/or long-term storage of various information needed for the functioning of the respective elements. The memory may further store software or firmware for programming the processing device with the logic or code needed to perform its functionality.

A brief overview description of some of the functionality of the EPC 210 (and its various logical entities or devices), eNodeBs 240-1 . . . 240-5, UEs 250-1 . . . 250-4, and the application server 260 shown in FIG. 2 will now be provided.

The EPC 210 is an all-IP core network that provides mobile core functionality that, in previous mobile generations (2G, 3G), has been realized through two separate sub-domains: circuit-switched (CS) for voice and packet-switched (PS) for data. The EPC 210 enables the above-mentioned all IP end-to-end delivery of media: from UEs 250 with embedded IP capabilities, over IP-based eNodeBs 240, across the EPC 210 and throughout the application domain. Further details regarding with EPC 210 will be described below with reference to FIG. 3.

The UEs 250 are also referred to in the art as subscribers, communication devices, access devices, access terminals, mobile stations, mobile subscriber units, mobile devices, user devices, and the like. The UEs 250 can be any type of communication device such as radios, mobile phones, mobile data terminals, Personal Digital Assistants (PDAs), laptops, two-way radios, cell phones, and any other device capable of operating in a wired or wireless environment and that can be used by a user in the system.

The eNodeBs serve as the intermediate infrastructure device between the UEs and the EPC 210 and a point of access for the UEs to their assigned or allocated bearers. Each cell represents a geographic coverage area that provides the wireless resources or "bearers" for carrying data to/from UEs that are connected to the E-UTRAN. In one implementation, each of the eNodeBs 240 includes three cells, and each of the eNodeBs 240 has roughly the same coverage area; however, in other implementations, the number of cells per eNodeB coverage area may be one or more, and the coverage areas of each eNodeB can vary.

The application server 260 facilitates transport of media (e.g., voice, data, video, etc.) from one or more source applications to one or more destination UEs 250 over the LTE system. As such, the application server may be, for instance, a computer aided dispatch (CAD) server, a media server, a call controller, etc. In one illustrative embodiment, application server 260 provides application layer services to UEs 250 connected to the E-UTRAN that are authorized and have the capabilities to use these services. As an example, the application server 260 can provide services that include, but are not limited to, push-to-talk (PTT) call services, Push-to-Video (PTV) services, Push-to-anything (PTX) services, etc. to the UEs 250. The AS 260 assigns "bearers" used to transport media to UEs 250.

As noted above, the term "bearer" refers to a logical transmission path or link established between two points in a network (e.g., between UEs and the EPC 210). A bearer is used to carry user or control data (also referred to as traffic, communications or service data flows (SDFs)) through the network either to or from UEs. Each bearer has a certain set of characteristics or attributes associated therewith including, but not limited to, a Modulation and Coding Scheme level, a Quality of Service (QoS), a carrier frequency at which data is modulated, a particular bandwidth, bit rate, etc. In addition, a bearer can be bidirectional, e.g., having both an uplink path from the UE to the application server and a downlink path from the application server to the UE; or a bearer can be unidirectional.

One example of a bearer is a point-to-point (PTP) unicast bearer. A PTP unicast bearer can be unidirectional or bidirectional. That is, a PTP unicast bearer may have both an uplink and a downlink component and the selection of unidirectional or bidirectional is determined at bearer set-up time. A PTP unicast bearer can be used, for example, to carry traffic over a dedicated PTP downlink path from the application server 260 to the UEs 250 or vice-versa.

Another example of a bearer is a MBMS point-to-multi-point (PTM) bearer. A MBMS PTM bearer is used to carry MBMS traffic over a common point-to-multipoint (PTM) downlink path from the application server 260 to the UEs 250. A MBMS PTM bearer is generally associated with a service (and can therefore also be referred to as a MBMS service). As is known in the art, each MBMS PTM bearer is identified using a unique (i.e., different) identifier, which in the 3GPP TSs is called a Temporary Mobile Group Identity (TMGI). Between the eNodeB and the UE, the MBMS PTM bearer takes the form of a Multicast Traffic Channel (MTCH), with the traffic associated to a specific TMGI being carried by a specific MTCH at any given time.

In accordance with some embodiments, the application server 260 assigns or allocates PTP unicast bearers to transport media to individual UEs, and also assigns or allocates MBMS PTM bearers to transport media, for example, to a plurality of UEs such as those that belong to a communication group. In this context, a communication group can be defined as a group of member UEs that become associated or affiliated with the group for the purposes of receiving one or more common media streams. Moreover, a media stream is defined as messaging comprising one or more packets that carry media (e.g., voice, data, video, etc.), and a packet is defined in general as a message structure for partitioning the media stream for transmission. However, the message structure of the media does not limit the scope of the disclosed embodiments. As such, the disclosed embodiments can be applied to the transmission of media streams having other message structures.

The application server 260 can perform any of the various functions that the controller 160 of FIG. 1 can perform. The application server 260 includes a computer processor that implements a bearer establishment and control module 261 that performs processing to determine when PTM and PTP bearers should be established towards various UEs, and a MCS control module 262 that can perform processing in order to determine when an MCS level applied to downlink transmissions over a PTM bearer should be adjusted. For example, the application server 260 includes a processor that processes events to determine, based on the event, whether a current MCS level applied to downlink transmissions over a downlink PTM bearer is to be changed (e.g., incremented or decremented) or maintained. The events processed at the application server 260 can include at least those described above with respect to FIG. 1, and as will be described in greater detail below. Whenever the application server 260 determines that the current MCS level is to be changed, the application server 260 can communicate either an increment message, or a decrement message, as described above with respect to FIG. 1, and as will be described in greater detail below.

The EPC 210 includes an infrastructure device (not illustrated in FIG. 2), and a computer processor that is capable of implementing a MCS adjustment module 225. The MCS adjustment module 225 is able to set and change the MCS level applied to downlink transmissions over PTM bearers. The MCS adjustment module 225 can adjust the MCS level that is applied to downlink transmissions over a downlink PTM bearer in response to receiving a decrement message (from an outside source such as the application server 260) or in response to an increment message (that can either be internally generated or received from an outside source such as the application server 260). The MCS adjustment module 225 can be implemented at any logical entity or device within the EPC 210 that is designed to communicate with the eNodeBs 240. One particular implementation will be described below with reference to FIG. 3.

As is well-known in the art, each of the UEs 250 includes at least one transmitter, at least one receiver, and at least one processor for performing the functionality described below. Furthermore, each of the UEs 250 is designed to operate in a point-to-point (PTP) operating mode and/or a point-to-multipoint (PTM) operating mode at any given time, and the remainder of the system 200 can be used for distributing content to each of the UEs 250 using a downlink point-to-multipoint (PTM) bearer and downlink point-to-point (PTP) bearers.

Each UE 250 can receive information over a downlink PTM bearer. A processor at each of the UEs 250 can determine whether reception of information (e.g., quality of a received downlink transmission) over the downlink PTM bearer is adequate or inadequate. In one implementation, the processor can include an RF measurement module for measuring characteristics of signals transmitted from the eNodeBs 240, and the processor process these signals to determine quality characteristics of those signals.

Each of the UEs 250 can determine that the reception over the downlink PTM bearer (e.g., the quality of the downlink transmission over the downlink PTM bearer) is inadequate using at least the criteria described above, with reference to FIG. 1. In addition, when any one of the UEs 250 determines that the reception of information (e.g., quality of a received downlink transmission) over the downlink PTM bearer is inadequate, it can transmit or send the application server 260 one or more of a complaint message, and a request message, as described above with reference to FIG. 1.

Each UE can also process a signal and/or an instruction to switch to a PTP operating mode, or to switch to a PTM operating mode, as described above with reference to FIG. 1, and as will be described in greater detail below. The mobile station switches between these operating modes in a manner that allows continued reception of media being communicated.

Figure 3:
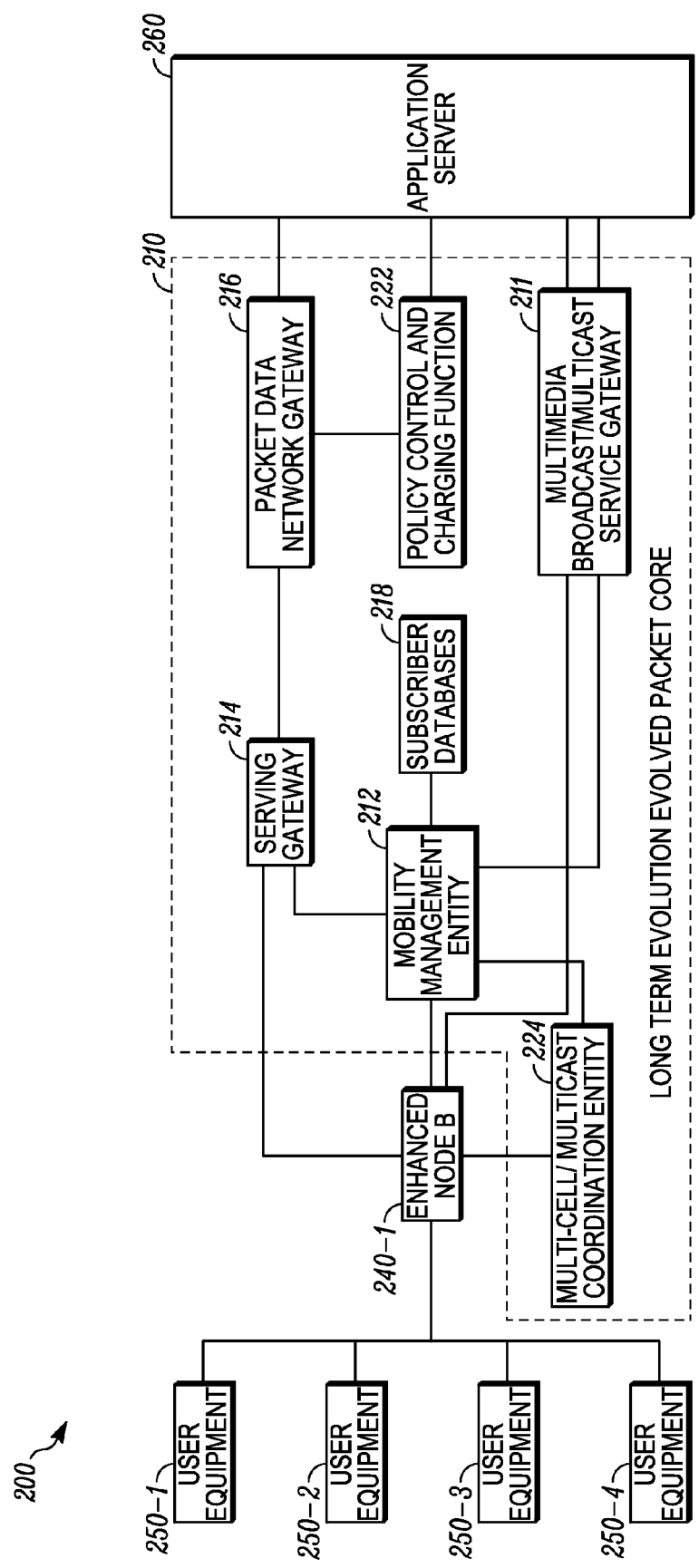
FIG. 3 is a block diagram illustrating the communication system of FIG. 2 that illustrates further details of the LTE Evolved Packet Core (EPC) in which some of the disclosed embodiments can be implemented in accordance with one implementation.

FIG. 3 is a block diagram of the communication system 200 of FIG. 2 that illustrates further details of the LTE Evolved Packet Core (EPC) 210 in which some of the disclosed embodiments can be implemented in accordance with one implementation.

As described above with respect to FIG. 2, the system 200 includes the LTE Evolved Packet Core (EPC) 210, an eNodeB 240-1, UEs 250-1 . . . 250-4, and the application server 260. For sake of brevity, the description of the eNodeB 240-1, UEs 250-1 . . . 250-4, and the application server 260 will not be repeated.

FIG. 3 further illustrates the logical entities or elements or devices 211, 212, 214, 216, 218, 222, 224 that can be implemented within the EPC 210. More specifically, in this implementation, the EPC 210 includes a MBMS Gateway (MBMS GW) 211, a Mobility Management Entity (MME) 212, a Serving Gateway (SGW) 214, a Packet Data Network Gateway (PDN GW) 216, subscriber databases (HSS) 218, a policy control and charging function (PCRF) 222, and a Multi-cell/multicast Coordination Entity (MCE) 224. The EPC 210 also includes various interfaces (also referred to in the art as reference points) between the logical entities that are defined in the LTE standards, but are not labeled in FIG. 3 for sake of simplicity. Additional known elements and interfaces in an EPC as described in the 3GPP TSs for LTE are not shown in FIG. 3 for the sake of clarity.

Moreover, although the logical entities 211, 212, 214, 216, 218, 222, 224 of the EPC 210 are shown as separate logical blocks in FIG. 3, it is noted that while each can be implemented in separate hardware devices, in other implementations, the logical entities 211, 212, 214, 216, 218, 222, 224 can be combined and implemented in one or more hardware devices.

Also, the EPC 210, depending on the size of the network, may have several such components serving thousands or tens of thousands of UEs and serving many application servers. Each of the logical entities 211, 212, 214, 216, 218, 222, 224 of FIG. 3 will now be described in greater detail.

Logical Entities of the LTE EPC

MBMS Gateway (MBMS GW)

The MBMS GW 211 is a logical entity or device that serves as an entry point in the LTE system for incoming MBMS data or "traffic" from an application server 260. The MBMS GW 211 distributes MBMS data to all eNodeBs 240 within the MBMS service areas that are transmitting the service. As noted above, MBMS may use Single Frequency Network (SFN) transmission, also referred to as MBSFN. In MBSFN, or more particularly in a given MBSFN geographic area, the MBMS transmission happens from a time-synchronized set of eNodeBs in the service area, using the same resource blocks. IP multicast can be used for distributing the traffic from the MBMS GW 211 to the different eNodeBs 240. Moreover, in an embodiment, media is delivered from the LTE EPC (via the MBMS GW 211) to the eNodeBs in each MBSFN Area of the E-UTRAN using Protocol-Independent Multicast source-specific multicast (PIM-SSM). The MBMS GW 210 also participates in MBMS Session Control Signaling (MBMS Sessions start/session stop/session update) by delivering these messages from a Broadcast Multicast-Service Center (BM-SC) towards the E-UTRAN via MME 212. The MBMS GW 210 creates MBMS bearer contexts based on the attributes delivered within the MBMS session control signaling.

Mobility Management Entity (MME)

The MME 212 is a logical entity or device that serves as the key control-node for UE access on the LTE E-UTRAN. The MME 212 is involved in the bearer activation/deactivation process and supports functions related to bearer and connection management. See 3GPP TS23.002 Section 4.1.4.1, TS24.301, TS36.300 Section 19 and TS36.401. The MME 212 is also responsible for choosing the SGW 214 for a UE at the time of initial attachment, and at time of intra-LTE handover. The MME 212 is also responsible for idle mode UE tracking and paging procedure including retransmissions. The MME 212 is also responsible for authenticating the user (by interacting with a Home Subscriber Server (HSS) 218). The MME 212 is also responsible for generation and allocation of temporary identities or identifiers to UE. The MME 212 is also responsible for relaying MBMS Control Signaling messages between the MBMS-GW and the one or more MCEs. The MME 212 creates MBMS bearer contexts based on the attributes delivered within the MBMS Session Control Signaling.

Serving Gateway (SGW)

The SGW 214 is a logical entity or device that routes and forwards user point-to-point data packets. For example, the SGW 214 can support user data and provides routing and forwarding functionality between the eNodeB and PDN (Packet Data Network). The SGW 214 also serves as a mobility anchor point (e.g., fixed connection route during a communication session) for the user plane during for handovers between eNBs (inter-eNB handovers), and as a mobility anchor point for inter-3GPP mobility (e.g., between LTE and other 3GPP networks). There are also links between the SGW 214 and the eNodeBs for transporting media that are not shown in FIG. 3 for the purpose of simplifying the diagram. The SGW 214 monitors and maintains context information related to the UE and generates paging requests when data for the UE arrives from the network. For idle state UEs, the SGW terminates the DL data path and triggers paging when DL data arrives for the UE. It manages and stores UE contexts, e.g. parameters of the IP bearer service, network internal routing information. It also performs replication of the user traffic in case of lawful interception.

Packet Data Network Gateway (PDN GW)

The PDN GW 216 is a logical entity or device that provides connectivity to the UE to external packet data networks (PDNs) by being the point of exit and entry of traffic for the UE. A UE may have simultaneous connectivity with more than one PDN GW for accessing multiple PDNs. The PDN GW 216 performs policy enforcement, packet filtering for each user, charging support, lawful interception and packet screening using policy and charging rules provided by a Policy and Charging Rules Function (PCRF) 222. The PDN GW 218 also serves as the anchor point for mobility between 3GPP and non-3GPP technologies such as those described in WiMAX and 3GPP2 standards.

Multi-Cell/Multicast Coordination Entity (MCE)

The MCE 224 is a logical entity or device that is responsible for allocation of radio resources (e.g., time and frequency resources) used for multi-cell MBMS transmissions by all eNodeBs in a MBSFN area. In some implementations, the MCE 224 may be integrated as part of the eNodeB. The MCE 224 may also be integrated as part of the MME 212.

The MCE 224 performs scheduling on the radio interface and ensures that transmissions are synchronized. The MCE 224 resides in the MBMS control plane and receives MBMS Session Control Signaling from the MME and distributes to a set of eNodeBs. The MCE determines the set of eNodeBs based on the MBMS Service Area. The MCE 224 creates MBMS contexts based on the attributes delivered within the MBMS Session Control Signaling for scheduling of radio resources. In addition to allocating radio resources, the MCE 224 determines further details of the radio configuration, such as the modulation and coding scheme level that will be used for MBMS PTM transmissions. The modulation and coding scheme level will be described in greater detail below with reference to FIG. 4.

Figure 4:
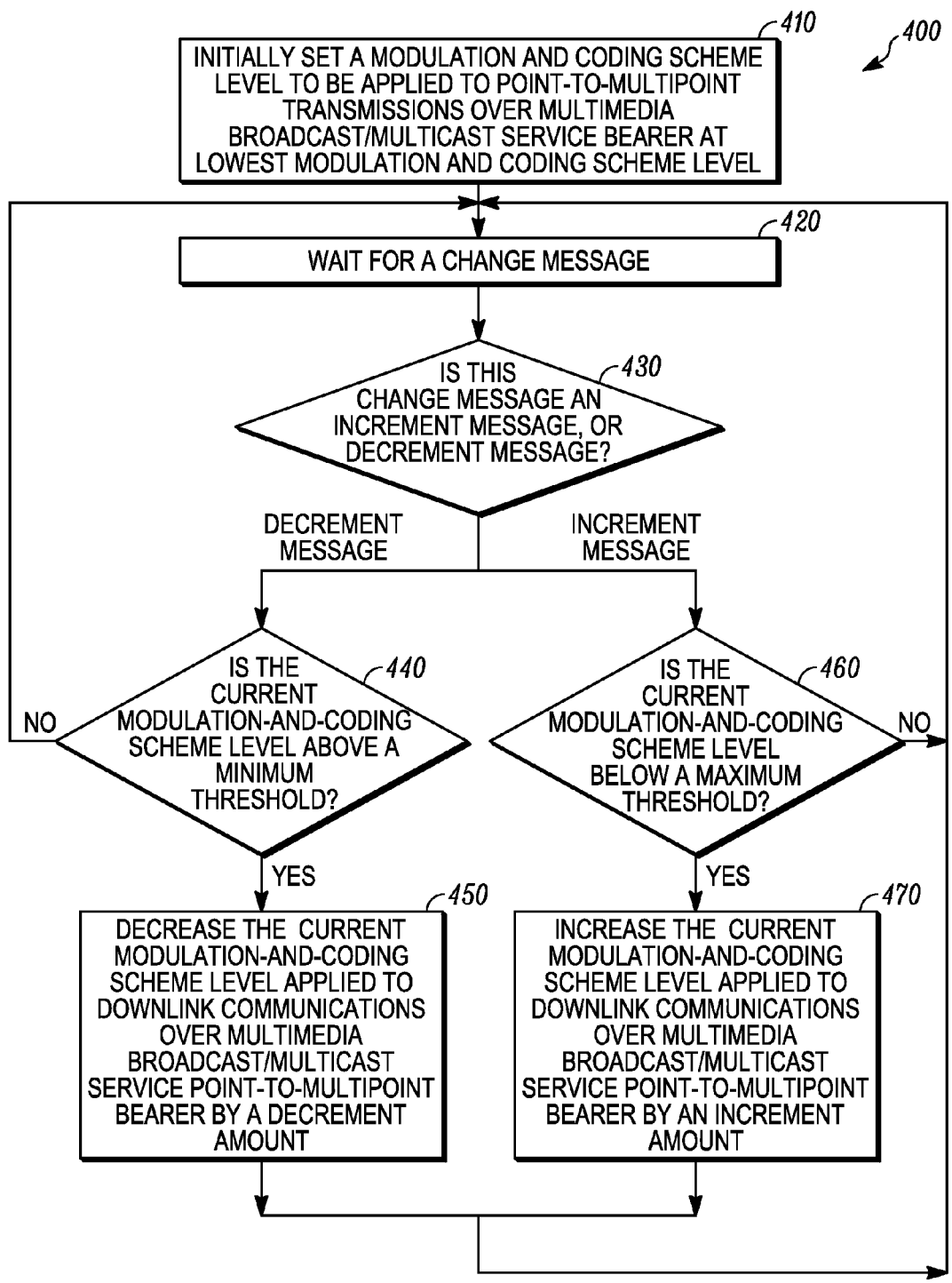
FIG. 4 is a flowchart that illustrates a processing method executed at a Multi-cell/multicast Coordination Entity (MCE) for adjusting a modulation-and-coding scheme (MCS) level that is applied to downlink transmissions over a downlink Multimedia Broadcast Multicast Service (MBMS) point-to-multipoint (PTM) bearer in accordance with some of the disclosed embodiments.

FIG. 4 is a flowchart that illustrates a processing method 400 executed at a MCE 224 for adjusting a MCS level that is applied to downlink Multimedia Broadcast Multicast Service (MBMS) transmissions over a MBMS PTM bearer in accordance with some of the disclosed embodiments. Method 400 runs continuously at the MCE 224. Preliminarily, it is noted that the terms "MBMS PTM bearer," "downlink MBMS PTM bearer," and "3GPP MBMS bearer" are used interchangeably herein.

The method 400 begins at 410 when the MCE 224 initially sets the MCS level that is to be applied to transmissions over the MBMS PTM bearer at an initial MCS level. In one particular implementation that is illustrated in FIG. 4, the initial MCS level can be, for example, a "lowest" MCS level. The lowest MCS level can be, for example, the MCS level that is the most reliable for the receiving UEs 250 to decode.

Table 1 is a table that shows modulation and coding scheme (MCS) levels along with their corresponding modulation order and transport block size (TBS) in bits.

TABLE 1

| MCS Level | Modulation Order | Transmission Block Size (in bits) |
| --- | --- | --- |
| 2 | 2 | 1096 |
| 3 | 2 | 1416 |
| 4 | 2 | 1800 |
| 5 | 2 | 2216 |
| 6 | 2 | 2600 |
| 7 | 2 | 3112 |
| 8 | 2 | 3496 |
| 9 | 2 | 4008 |
| 10 | 4 | 4392 |

As will be appreciated by those skilled in the art, in the context of an LTE system, a "modulation and coding scheme (MCS)" refers to a combination of a modulation scheme and a code rate. For example, a modulation scheme can refer to a number of different Quadrature Phase Shift Keying (QPSK) modulation techniques, a number of different Quadrature Amplitude Modulation (QAM) techniques, etc. Lower-order modulation schemes (e.g., few data bits per modulated symbol, e.g., QPSK) are more robust and can tolerate higher levels of interference but provides a lower transmission bit rate. High-order modulation schemes (e.g., more bits per modulated symbol, e.g. 64 QAM) offer a higher bit rate but are more prone to errors due to its higher sensitivity to interference, noise and channel estimation errors, and are therefore more useful only when the Signal to Interference-plus-Noise Ratio (SINR) is sufficiently high. In addition, the code rate for a given modulation can be chosen depending on the radio link conditions: a lower code rate (or stronger code) can be used in poor channel conditions (e.g., low SINR) and a higher code rate (or weaker code) can be used in the case of high SINR.

Table 1 is derived based on information from 3GPP TS 36.213, "Evolved Universal Terrestrial Radio Access (E-UTRA); Physical Layer Procedures," a copy of which can be obtained at the following URL: http://www.3gpp.org/ftp/Specs/archive/36_series/36.213/36213-880.zip. On page 25 of the 3GPP TS 36.213 standard, the first two columns and rows 2-10 of Table 7.1.7.1, shows the information in columns 1 and 2 of the Table 1. The third column and rows 2-10 of Table 7.1.7.1, shows indices of Transport Block Size (ITBS), which is used to derive the Transport Block Size (TBS) information in column 3 of the Table 1 (e.g., Table 7.1.7.2.1-1 on page 28 of the 3GPP TS 36.213 standard show the TBS information in column 3 of the Table 1 that corresponds to ITBS indices). It is noted that Table 1 is not comprehensive and does not show all potential MCS levels, but instead shows only MCS levels 2 through 10 are shown in column 1. In the current LTE standards, thirty-two MCS levels (0 ... 31) are defined. Each MSC index (0 ... 31) is transmitted by an eNodeb to one or more UEs to signal to the UE(s) which modulation and coding scheme is to be used to use for transmitting and receiving a certain transport block. Each MCS level/index corresponds to a combination of modulation order (column 2) and TBS index (not shown in the table), and the TBS size (column 3) in bits can be derived from the TBS index. The MCS index signals to the UE the modulation and coding scheme to use for either transmitting or receiving data in a certain transport block.

Table 1 illustrates that transport block size (in bits) increases as the MCS level increases. As can be seen from Table 1, the higher the MCS index the more information (bits) can be transmitted within a transport bock, thus increasing the LTE RF utilization. Optimally it is advantageous to transmit traffic at the highest possible MCS without degrading reception reliability. The MCS index is held constant for the entirety of an MBMS session and is usually set to a low MCS index (e.g. MCS 2-4) to provide high reliability of MBMS delivery. With appropriate UE feedback however, the MCS levels for MBMS could be dynamic and increased to an optimal level for RF utilization and reliability.

Referring again to FIG. 4, following 410, method 400 then proceeds to 420, where the MCE 224 waits for a change message to be received. The change message can be either an increment message or a decrement message. An increment message can either be transmitted from the application server 260, or internally generated by the MCE 224 itself. A decrement message is transmitted from the application server 260.

Thus, the application server 260 can transmit either a decrement message or an increment message. The application server 260 can automatically generate either the decrement message or the increment message in response to trigger events that include, but are not limited to, for example:
receipt of a complaint message or a number of complaint messages from one or more UEs;
receipt of a request message or a number of request messages from one or more UEs;
expiration of a timer that maintains the time elapsed since the last increment/decrement message,
a time of day trigger that occurs at a specific time each day,
a traffic volume trigger that occurs when a number of packets per second exceeds a threshold,
a dropped packets trigger that occurs when a number of dropped packets exceeds a threshold, etc.

The message that is internally generated by the MCE 224 can be an increment message, and the MCE 224 can automatically generate increment message in a response to trigger events that include, but are not limited to, for example:
expiration of a timer that maintains the time elapsed since the last increment/decrement message,
a time of day trigger that occurs at a specific time each day, etc.

In some embodiments, any two or more of the various triggers described above can be used together as conditions that are evaluated in any order (or alternatively evaluated in a specific order) for generating either an increment message or a decrement message (e.g., two or more of the conditions must occur in any order (or alternatively conditions that must occur in some specific order) before an increment message or a decrement message will be generated).

At 430, the MCE 224 determines whether the received change message is an increment message or a decrement message.

When the MCE 224 determines that the received change message is a decrement message, the method 400 proceeds to 440, where the MCE 224 determines whether the current MCS level is above a minimum threshold (e.g., a preconfigured minimum threshold), and if so, the method 400 proceeds to 450, where the MCE 224 executes a decrement process and decrements or decreases the current MCS level applied to communications over the MBMS PTM bearer by a decrement amount, and then applies a MCS at the decreased MCS level to the MBMS PTM bearer. Method 400 then loops back to 420. By contrast, when the MCE 224 determines (at 440) that the current MCS level is not above the minimum threshold, the method 400 loops back to 420.

When the MCE 224 determines (at 430) that the received change message (that was received at 420) is an increment message, the method 400 proceeds to 460. At 460, the MCE 224 determines whether the current MCS level is below a maximum threshold (e.g., a preconfigured maximum threshold).

When the current MCS level is below the maximum threshold, method 400 proceeds to 470, where the MCE 224 executes an increment process. The MCE 224 increases or increments the current MCS level to be applied to communications over the MBMS PTM bearer by an increment amount, and applies a MCS at the increased MCS level to the MBMS PTM bearer. Method 400 then loops back to 420. By contrast, when the MCE 224 determines (at 460) that the current MCS level is at or above (e.g., not below) the preconfigured maximum threshold, method 400 loops back to 420.

Figure 5:
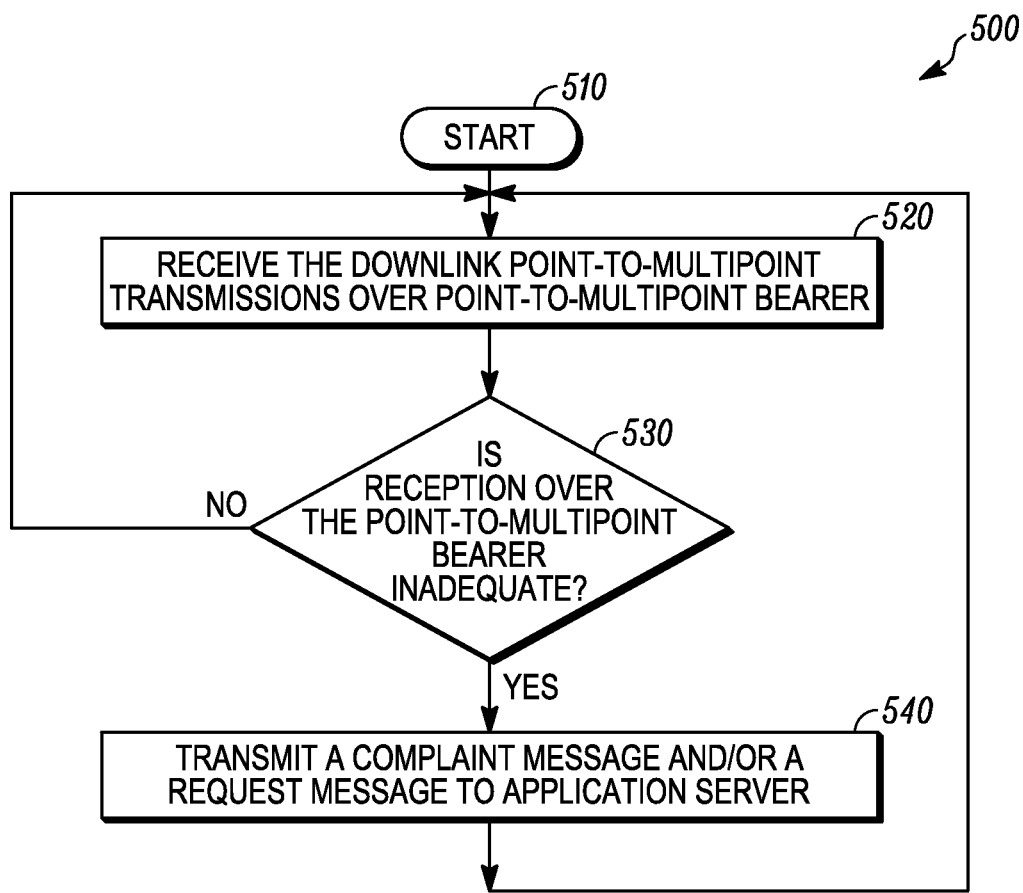
FIG. 5 is a flowchart that illustrates a processing method executed at each of the user equipment (UEs) within a network for generating complaint messages and/or request messages in response to determining that reception over a downlink Multimedia Broadcast Multicast Service (MBMS) point-to-multipoint (PTM) bearer is inadequate in accordance with some of the disclosed embodiments.

FIG. 5 is a flowchart that illustrates a processing method 500 executed at each of the UEs 250 for generating complaint messages and/or request messages in response to determining that reception over a downlink MBMS PTM bearer is inadequate in accordance with some of the disclosed embodiments. Method 500 is applied or executed at all UEs 250 that are PTM group members and are receiving packets as part of a downlink PTM transmissions over a MBMS PTM bearer.

Method 500 begins at 510, and at 520, a UE 250 attempts to receive downlink MBMS PTM transmissions over a downlink MBMS PTM bearer, and the method 500 proceeds to 530.

At 530, the UE 250 determines whether reception of the information over the downlink MBMS PTM bearer is inadequate. When the UE 250 determines that the reception of the information over the downlink MBMS PTM bearer is adequate, the method 500 loops back to 520. In accordance with some embodiments, the UE 250 can determine that the reception of the information over the downlink MBMS PTM bearer is adequate, for example, when packets that are received as part of the downlink PTM transmissions are able to be adequately decoded (e.g., the number of the packets with errors is less than a threshold).

In accordance with some embodiments, the UE 250 can determine that the reception over the downlink MBMS PTM bearer is inadequate, for example, when at least one of the following occurs: the UE 250 cannot detect a downlink transmission over the downlink MBMS PTM bearer; the UE 250 determines that the downlink MBMS PTM bearer is not transmitted at a current location of the UE; or the UE 250 decodes packets received over the downlink MBMS PTM bearer and determines that a number of the packets with errors is greater than a threshold. In accordance with some embodiments, the UE 250 can determine that the downlink MBMS PTM bearer is not transmitted at the current location of the UE, when at least one of the following occurs: the UE 250 determines, based on content of received signaling, that the downlink MBMS PTM bearer is not transmitted at the current location of the UE; or the UE 250 determines, based on pre-stored information, that the downlink MBMS PTM bearer is not transmitted at the current location of the UE.

When the UE determines that the reception of the information over the downlink MBMS PTM bearer is inadequate, the method 500 proceeds to 540, where the UE can generate and transmit either a complaint message and/or a request message to the application server 260. After 540, the method 500 then loops back to 520.

Trigger Events for a Complaint Message

In general, the complaint message is transmitted by a UE to the application server 260 to indicate to the application server 260 that the reception over the downlink MBMS PTM bearer is inadequate.

For example, in one embodiment, a UE can transmit a complaint message whenever the UE determines that reception of PTM traffic is "poor." For instance, in one implementation, a UE can transmit a complaint message when the UE determines that a computed percentage of erroneous packets (consecutive or not) that are received over the downlink MBMS PTM bearer during a measurement period exceeds a threshold.

However, a complaint message can also be transmitted by a UE in response to various other trigger events that include, such as when the UE determines that PTM traffic is not supported in its particular MBSFN. For instance, in one implementation, a UE can decode control channels, and transmit a complaint message when the UE determines that specific MBMS service is not being offered in its particular MBSFN.

Further, in some embodiments, any two or more of the various triggers described above can be used together as conditions that are evaluated (either in any order or in a specific order) for generating a complaint message (e.g., two or more of the conditions must occur in any order before a complaint message will be generated, or two or more of the conditions must occur in some specific order before a complaint message will be generated).

Trigger Events for Request Messages

In one embodiment, when the UE determines that the reception over the downlink MBMS PTM bearer is inadequate, the UE can generate and transmit a request message to the application server, where the request message indicates that the reception over the downlink MBMS PTM bearer has become inadequate and is interpreted as a request to the application server 260 to establish a PTP bearer for that particular UE. This particular type of request message can also be referred to as a PTP connection request message. For example, in one embodiment, a UE can transmit a PTP connection request message when the UE determines that reception of PTM traffic is "poor." For instance, in one implementation, a UE can transmit a PTP connection request message when the UE determines that a computed percentage of erroneous packets (consecutive or not) that are received over the PTM bearer during a measurement period exceeds a threshold. In another embodiment, a UE can transmit a PTP connection request message when the UE determines that PTM traffic is not supported in its particular MBSFN. For instance, in one implementation, a UE can decode control channels, and transmit a PTP connection request message when the UE determines that specific MBMS service is not being offered. In some embodiments, any two or more of the various triggers described above can be used together as conditions that are evaluated in any order (or alternatively in some specific order) for generating a PTP connection request message (e.g., two or more of the conditions must occur in any order (or alternatively in some specific order) before the request message will be generated and transmitted by the UE).

Figure 6:
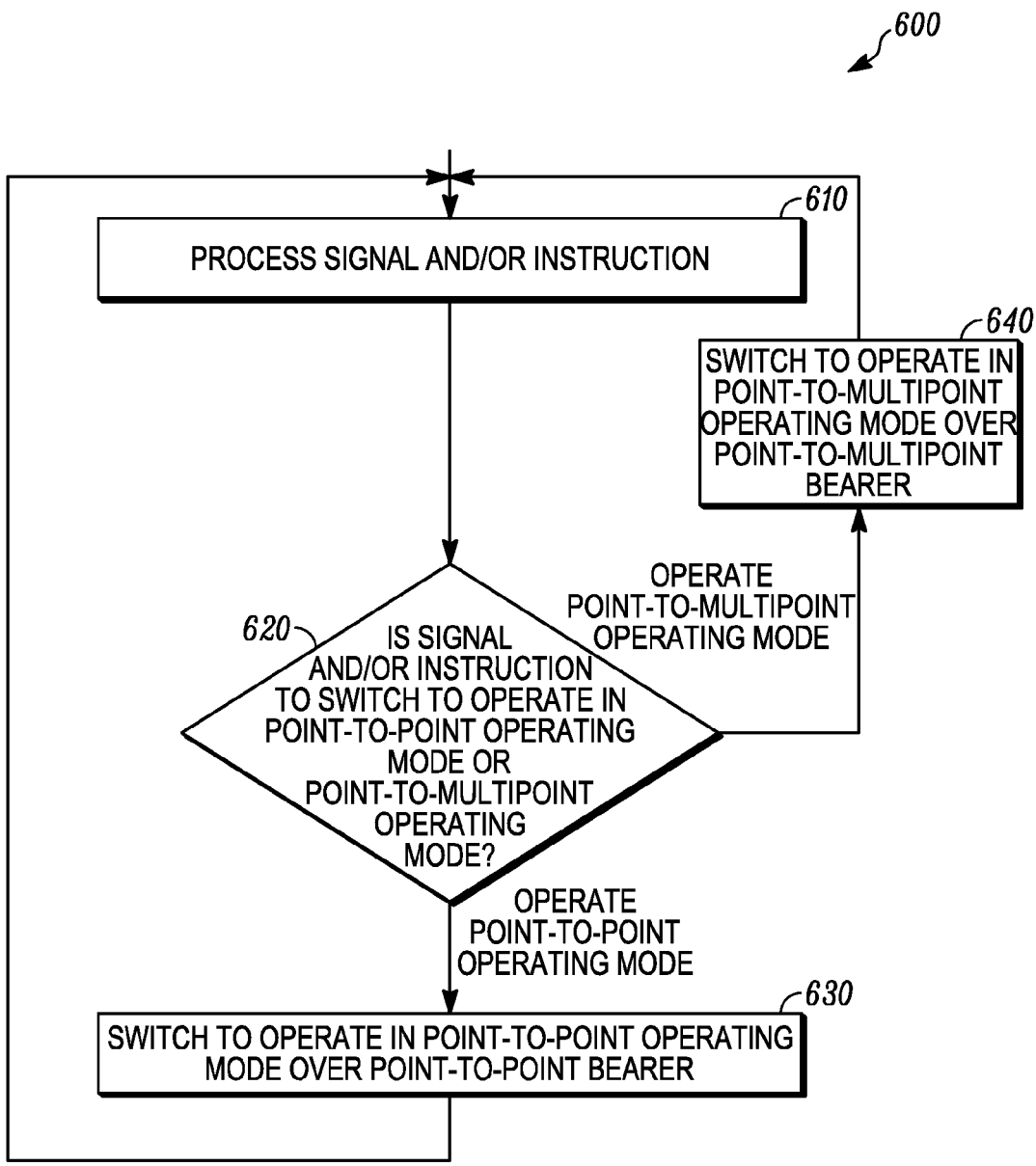
FIG. 6 is a flowchart that illustrates a processing method executed at each of the user equipment (UEs) within a network for switching between a point-to-point (PTP) operating mode and a point-to-multipoint (PTM) operating mode and vice-versa in accordance with some of the disclosed embodiments.

FIG. 6 is a flowchart that illustrates a processing method 600 executed at UEs 250 for switching between a PTP operating mode and a PTM operating mode and vice-versa in accordance with some of the disclosed embodiments. Method 600 is applied or executed at all UEs 250 that are PTM talk group members. Method 600 runs continuously at each of these UEs 250 to determine whether or not that UE 250 should be operating in PTP operating mode or operating in PTM operating mode.

Method 600 begins at 610, where the UE processes a signal and/or an instruction, and then proceeds to 620. The signal and/or instruction can be either internally generated by the UE 250, or communicated to the UE 250 from an external source (e.g., generated at an application server 260 and transmitted to the UE 250).

Internally Generated Instruction to Switch Operating Mode

The UE 250 can self-generate the instruction to switch to PTP operating mode when the UE determines that PTM signal quality is below a threshold, or when the UE determines that it is located in an area that is known not to support PTM mode, or when the UE determines that reliable delivery of the MBMS service is required. In some embodiments, any two or more of the various triggers described above can be used together as conditions that are evaluated in any order for self-generating the instruction to switch to PTP operating mode (e.g., two or more of the conditions can occur in any order before the instruction to switch to PTP operating mode will be self-generated by the UE). In some embodiments, any two or more of the various triggers described above can be used together as conditions that are evaluated in a specific order before self-generating the instruction to switch to PTP operating mode (e.g., two or more of the conditions must occur in some specific order before the instruction to switch to PTP operating mode will be self-generated by the UE 250).

In some embodiments, the UE 250 can self-generate the instruction to switch to PTM operating mode when the UE determines that PTM signal quality is above a threshold (e.g., signal quality usually is assessed based on the percentage of erroneous received packets), or when the UE determines that it is located in an area that is known to support PTM operating mode. In some embodiments, any of the various triggers described above can be used together as conditions that are evaluated in any order for self-generating the instruction to switch to PTM operating mode (e.g., the conditions can occur in any order before the instruction to switch to PTM operating mode will be self-generated by the UE).

Application Server Generated Signal and/or Instruction to Switch to PTP Operating Mode In some embodiments, the application server 260 can generate and transmit a signal that may include an instruction to switch to PTP operating mode to the UE 250 when the application server 260 determines that the UE 250 is located in an area that is known not to support PTM mode, or when the application server 260 determines based on complaint messages received from the UE 250 that the UE 250 is to be instructed to switch to PTP mode, or when the application server 260 determines that reliable delivery of the MBMS service is required. In some embodiments, any two or more of the various triggers described above can be used together as conditions that are evaluated in any order by the application server 260 before generating signal that includes the instruction to switch to PTP operating mode (e.g., two or more of the conditions must occur in any order before the instruction to switch to PTP operating mode will be generated by the application server 260). In some embodiments, any two or more of the various triggers described above can be used together as conditions that are evaluated by the application server 260 in a specific order before generating the instruction to switch to PTP operating mode (e.g., two or more of the conditions must occur in some specific order before the instruction to switch to PTP operating mode will be generated by the application server 260).

In some embodiments, the application server 260 can generate and transmit the instruction to switch to PTM operating mode to the UE 250 when the application server 260 determines that the UE 250 is located in an area that is known to support PTM operating mode.

In other embodiments, establishment of a bearer to the UE 250 is interpreted by the UE 250 as an implicit signal or instruction that can trigger the UE 250 switching to a PTP operating mode, or to a PTM operating mode.

Referring again to FIG. 6, at 620, the UE determines whether the signal and/or instruction is to switch to operate in a PTP operating mode, or to switch to operate in a PTM operating mode.

When the signal and/or instruction is to switch to PTP operating mode (from the PTM operating mode), the method 600 proceeds to 630, where the UE starts receiving downlink transmissions over a downlink, unicast PTP bearer. The UE 250 switches between these operating modes in a manner that allows for continued reception of media being communicated in a transparent manner. The method 600 then loops back to 610, where the UE 250 will continue to operate in PTP operating mode and receive transmissions over the unicast PTP bearer until another signal and/or instruction is received to switch from PTP operating mode.

When the signal and/or instruction is to switch to the PTM operating mode (from the PTP operating mode), the method 600 proceeds to 640, where the UE switches from the PTP operating mode to the PTM operating mode, and starts receiving downlink transmissions over a downlink MBMS PTM bearer. The UE 250 switches between these operating modes in a manner that allows for continued reception of media being communicated in a transparent manner. The method 600 then loops back to 610, where the UE 250 operates in PTM operating mode and receives MBMS transmissions over the MBMS PTM bearer until another signal and/or instruction is received to switch from PTM operating mode.

Figure 7:
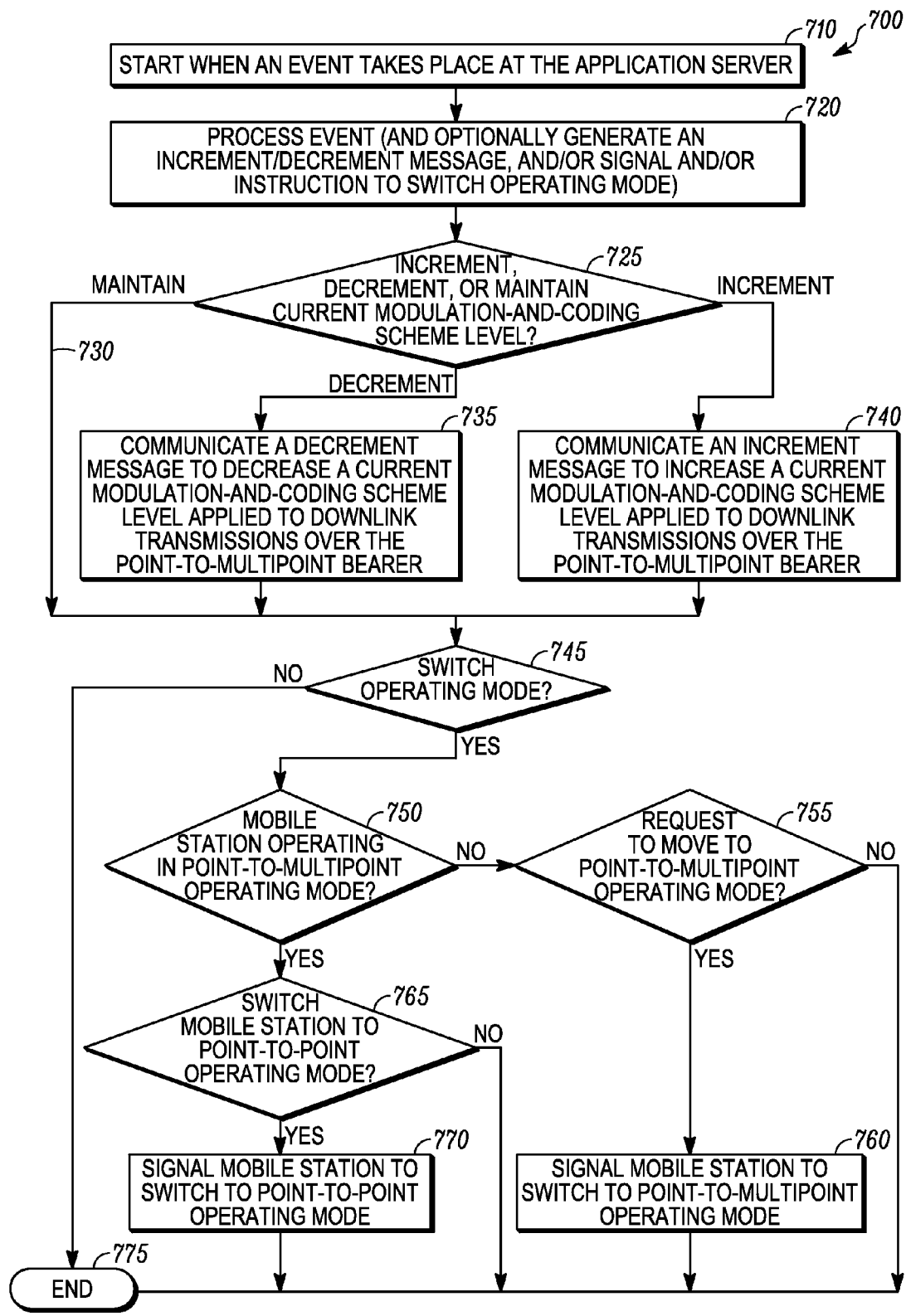
FIG. 7 is a flowchart that illustrates a processing method executed at an application server for distributing content to a group of user equipment (UEs) within a network using a downlink Multimedia Broadcast Multicast Service (MBMS) point-to-multipoint (PTM) bearer and downlink point-to-point (PTP) bearers in accordance with some of the disclosed embodiments.

FIG. 7 is a flowchart that illustrates a processing method 700 executed at an application server 260 for distributing content to a group of UEs using a downlink point-to-multipoint (PTM) bearer and downlink point-to-point (PTP) bearers in accordance with some of the disclosed embodiments. Blocks 710-740 describe processing of events to adjust a MCS level applied to downlink transmissions over a MBMS PTM bearer, and block 745-760 describe a method for signaling a UE 250 to switch between a PTP operating mode and a PTM operating mode and vice-versa.

Method 700 begins at 710 when an event takes place at the application server 260. The event can be, for example, either (1) receiving a complaint message from a UE 250, (2) receiving a PTM connection request message from a UE 250 to change its operating mode from PTP operating mode to PTM operating mode (or vice-versa), (3) internally generating an indication at the application server 260 that a first period of time has passed without receiving a complaint message from a UE 250, or (4) internally generating an indication at the application server 260 that a second period of time has passed without receiving a request message from the UE 250. A UE can transmit a PTM connection request message when the UE is operating in a PTP operating mode and determines that the reception over the downlink MBMS PTM bearer is adequate. In this scenario, the UE can generate and transmit a PTM connection request message to the application server 260, where the PTM connection request message indicates that the reception over the downlink MBMS PTM bearer has become adequate. For example, in one implementation, a UE that is operating in PTP mode can regularly or periodically (e.g., after changing serving eNB) attempt to decode some PTM packets transmitted over a downlink PTM bearer, and if percentage of erroneous packets is determined to be below a certain threshold, the UE can then transmit a PTM connection request message. The PTM connection request is interpreted by the application server as a request to the application server 260 to tear down a PTP bearer that was previously established for that particular UE.

At 720, the application server 260 processes the event that takes place at 710. At 725, based on processing of the event, the application server 260 determines whether or not the current MCS level applied to downlink transmissions over a downlink MBMS PTM bearer should be incremented, decremented or maintained, and generates either an increment message or a decrement message, or alternatively decides to do nothing. In some implementations of 720, the application server may also generate signal and/or an instruction to switch an operating mode of a particular UE.

Whether the current MCS level that is being applied to downlink transmissions over the downlink MBMS PTM bearer should be incremented, decremented can be triggered depending on various trigger events. Some examples of decrement trigger events and increment trigger events will now be described below.

Decrement Trigger Events

The application server 260 determines (at 725) that the current MCS level should be decremented in response to one or more decrement trigger event(s). Examples of decrement trigger events can include, but are not limited to:

a number of complaints received during the wait period or during another pre-defined time period;

a certain time of day (e.g., at certain times of day, when experience shows that other traffic is low, then the MCS level is decremented);

an indication that the system is lightly loaded (e.g., number of simultaneously active groups or the number of packets per second is below some expected threshold), or any other indication that MCS level should be decreased to provide improved signal coverage/quality.

The decrement trigger event can vary depending on the implementation, and can be either a single decrement trigger event or a combination of decrement trigger events depending on the implementation. In some embodiments, any two or more of the various decrement trigger events described above can be used together as conditions that are evaluated in any order (or in a specific order) before generating a decrement message (e.g., two or more of the conditions must occur in any order (or alternatively must occur in some specific order) before a decrement message will be generated and transmitted to the MCE 224).

Increment Trigger Events

The application server 260 determines that the current MCS level should be incremented in response to an increment trigger event. Examples of increment trigger events can include, but are not limited to:

not receiving any complaint messages during a timeout period;

receiving a certain number of PTM connection request messages from UEs requesting a switch to PTM operating mode during a defined wait period;

any other indication that a certain number of UEs have switched to PTP operating mode during a defined time period;

an indication of system congestion (e.g., congestion on the landline network; number of simultaneously active groups and/or number of packet per second is above some expected threshold);

a certain time of day (e.g., at certain times of day, when experience shows that other traffic is high, then the MCS level is incremented);

an indication that an incident has ended;

any other indication that MCS level applied over the PTM MBMS bearer should be incremented.

The increment trigger event can vary depending on the implementation, and can be either a single increment trigger event or a combination of increment trigger events depending on the implementation. In some embodiments, any two or more of the various increment trigger events described above can be used together as conditions that are evaluated in any order before generating an increment message (e.g., two or more of the conditions must occur in any order, or alternatively must occur in some specific order) before an increment message will be generated and transmitted to the MCE 224.

Referring again to FIG. 7, when the application server 260 determines (at 725) that the current MCS level should be decremented, method 700 proceeds to 735 where the application server 260 communicates a decrement message to the MCE 224 instructing the MCE 224 to decrease or decrement the current MCS level that is being applied to downlink transmissions over the downlink MBMS PTM bearer, and method 700 then proceeds to 745. In response to the decrement message, the MCE will decrease/decrement the MCS level that is being applied to the downlink transmissions over the downlink MBMS PTM bearer.

By contrast, when the application server 260 determines (at 725) that the current MCS level should be incremented, method 700 proceeds to 740 where the application server 260 communicates an increment message to the MCE 224 instructing the MCE 224 to increase or increment the current MCS level that is being applied to downlink transmissions over the downlink MBMS PTM bearer, and the method then proceeds to 745. In response to the increment message, the MCE will increase/increment the MCS level that is being applied to the downlink transmissions over the downlink MBMS PTM bearer.

When the application server 260 does not receive an event that results in increment or decrement triggers, the application server 260 maintains the current MCS level and method 700 proceeds via branch 730 to 745. For example, in one such embodiment, each time the application server performs processing at 720, the application determines whether the event results in increment trigger, decrement trigger, or maintain trigger. A maintain trigger can occur if not enough complaint messages were received in a given time period, or if a timer expires for the first time without reception of any complaints (e.g., a threshold of 20 consecutive complaint free time periods must occur before an increment or decrement is triggered). In cases where the event results in neither an increment or a decrement, the application server 260 simply proceeds via branch 730 to 745.

As noted above, in response to processing of the event, the application server can, in some cases, generate signal and/or an instruction for a UE to switch between a PTP operating mode and a PTM operating mode, and communicate the signal and/or instruction to the UE.

At 745, the application server 260 determines whether or not the event at 710/720 was sourced ("or came from") a UE 250. When the application server 260 determines that the event was not sourced from a UE 250, method 700 proceeds to 775 where the method 700 ends.

When the application server 260 determines that the event (from 715) was sourced from a UE 250, method 700 proceeds to 750. At 750, the application server 260 determines whether the UE 250 is in PTM operating mode.

When application server 260 determines that the UE 250 is operating in the PTM operating mode the method proceeds to 765, where the application server 260 determines whether or not the UE 250 should be switched from PTM operating mode to PTP operating mode. When the application server 260 determines (at 765) that the UE 250 should not switch to PTP operating mode, the method 700 ends at 775. By contrast, when the application server determines that the UE 250 should be switched to PTP operating mode, method 700 proceeds to 770 where the application server 260 causes the UE 250 to switch to the PTP operating mode by either transmitting a signal to establish a PTP bearer to the UE 250 or transmitting a signal to the UE 250 with an instruction to switch operating mode. The method then ends at 775.

When the application server 260 determines that the UE 250 is not operating in PTM operating mode (at 750), method 700 proceeds to 755 where the application server 260 determines whether or not the received event (at 715) was a request message from the UE 250 to switch from PTP operating mode to PTM operating mode. When the application server 260 determines (at 755) that the event that was received at 715 is not a request to move to PTM operating mode (e.g., is a complaint message), the method 700 ends at 775. By contrast, when the application server 260 determines (at 755) that the received event (at 715) was a request message from the UE 250 to switch to PTM operating mode, method 700 proceeds to 760 where the application server 260 transmits a signal to the UE 250 with a signal and/or an instruction to switch to PTM operating mode. The method 700 then ends at 775.

Conclusion

The disclosed embodiments can provide methods, systems and apparatus that allow UEs to provide feedback regarding the quality of the received RF signals that carry MBMS transmissions so that MCS levels can be adjusted to help reduce resource utilization, while at the same time ensuring that all the UEs are able to properly decode the received RF signals. The disclosed embodiments can also use this feedback to take advantage of the dual PTM and PTP capabilities that are available in LTE systems. In one implementation, the methods, systems and apparatus of the disclosed embodiments can be implemented within existing LTE infrastructure in a way that does not impact the UE or LTE standards, and that moves the decision point outside the LTE E-UTRAN.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method for distributing content to a plurality of mobile stations, the method comprising:
    processing an event at a controller residing above a core network, wherein the core network resides above a radio access network comprising one or more base stations;
    determining, at the controller based on the event, whether a current modulation-and-coding scheme (MCS) level, applied to a downlink point-to-multipoint (PTM) bearer, is to be changed or maintained;
    communicating a change message from the controller to an actuator implemented by an infrastructure device of the core network when the controller determines that the current MCS level is to be changed; and
    adjusting, at the actuator each time a change message is received, a MCS level that is applied to downlink transmissions to the plurality of mobile stations over the downlink PTM bearer.

2. A method according to claim 1, wherein communicating a change message comprises:
    communicating an increment message; or
    communicating a decrement message.

3. A method according to claim 2, wherein communicating a decrement message includes:
    sending the decrement message, when the controller determines that the current MCS level is to be decremented, wherein the decrement message instructs the actuator to decrease the MCS level that is applied to the downlink transmissions over the downlink PTM bearer; and
    wherein adjusting further comprises:
    decreasing, at the actuator in response to the decrement message, the MCS level that is being applied to the downlink transmissions over the downlink PTM bearer.

4. A method according to claim 2, wherein communicating an increment message includes:
    sending the increment message, when the controller determines that the current MCS level is to be incremented, wherein the increment message instructs the actuator to increase the MCS level that is being applied to the downlink transmissions over the downlink PTM bearer, and
    wherein adjusting further comprises:
    increasing, at the actuator, the MCS level that is being applied to the downlink transmissions over the downlink PTM bearer.

5. A method according to claim 1, wherein the event comprises one or more of:
    reception of a complaint message from any mobile station,
    reception of a request message from any mobile station to change the operating mode of that particular mobile station, wherein the operating mode comprises either a point-to-point (PTP) operating mode or a point-to-multipoint (PTM) operating mode, an indicator internally generated by the controller when a first period of time has passed without receiving a complaint message from any mobile station, or an indicator internally generated by the controller when a second period of time has passed without receiving a request message from any mobile station.

6. A method according to claim 1, further comprising:
determining, at each mobile station of the plurality of mobile stations, whether reception of the information over the downlink PTM bearer is inadequate.

7. A method according to claim 6, wherein each of the mobile stations determines that the reception of the information over the downlink PTM bearer is inadequate when at least one of the following occurs:
the mobile station cannot detect a downlink transmission over the downlink PTM bearer;
the mobile station determines that the downlink PTM bearer is not transmitted at a current location of the mobile station; or
the mobile station decodes packets received over the downlink PTM bearer and determines that the number of decoding errors is greater than a threshold.

8. A method according to claim 7, wherein each of the mobile stations determines that the downlink PTM bearer is not transmitted at the current location of the mobile station, when at least one of the following occurs:
the mobile station determines based on content of received signaling that the downlink PTM bearer is not transmitted at the current location of the mobile station; or
the mobile station determines based on pre-stored information that the downlink PTM bearer is not transmitted at the current location of the mobile station.

9. A method according to claim 6, when the mobile station determines that the reception of the information over the downlink PTM bearer is inadequate, further comprising:
sending a complaint message to the controller; and/or
sending a request message to the controller to switch to a point-to-point (PTP) operating mode over a PTP bearer.

10. A method according to claim 1, further comprising:
transmitting a signal to a particular mobile station of the plurality of mobile stations to switch from a point-to-point (PTP) operating mode to a PTM operating mode; and
switching, at the particular mobile station in response to the signal, to the PTM operating mode.

11. A method according to claim 1, further comprising:
transmitting a signal to a particular mobile station of the plurality of mobile stations to switch from a PTM operating mode to a point-to-point (PTP) operating mode; and
switching, at the particular mobile station in response to the signal, to the PTP operating mode.

12. A method executed by an actuator implemented by an infrastructure device of a core network and for adjusting a modulation-and-coding scheme (MCS) level that is applied to downlink transmissions to a plurality of mobile stations over a point-to-multipoint (PTM) bearer, wherein the core network resides above a radio access network comprising one or more base stations, the method comprising:
receiving, at the actuator from a controller residing above the core network, a change message;
determining, by the actuator, whether the received change message is an increment message or a decrement message; and
when the received message is the decrement message:
decreasing, by the actuator, the current MCS level by a decrement amount, and
applying, by the actuator, a MCS at a decreased MCS level to the downlink PTM bearer; and
when the received message is the increment message:
increasing, by the actuator, the current MCS level by an increment amount, and
applying, by the actuator, a MCS at an increased MCS level to the downlink PTM bearer.

13. A method according to claim 12, wherein the increment message is either transmitted from a controller, or internally generated by the actuator; and
wherein the decrement message is transmitted from the controller.

14. A method executed by a controller residing above a core network, wherein the core network resides above a radio access network comprising one or more base stations, the method comprising:
processing an event;
determining, at the controller based on the event, whether a current MCS level applied to downlink transmissions to a plurality of mobile stations over a downlink point-to-multipoint (PTM) bearer is to be incremented, decremented or maintained;
when the controller determines that the current MCS level is to be decremented:
communicating a decrement message from the controller to an actuator implemented by an infrastructure device of the core network, wherein the decrement message instructs the actuator to decrement the current MCS level that is being applied to downlink transmissions over the downlink PTM bearer; and
when the controller determines that the current MCS level is to be incremented:
communicating an increment message from the controller to the actuator, wherein the increment message instructs the actuator to increment the current MCS level that is being applied to downlink transmissions over the downlink PTM bearer.

15. A method according to claim 14, wherein the event comprises one of:
receiving a complaint message received from a mobile station of the plurality of mobile stations,
receiving a request message from a mobile station to change an operating mode of a mobile station of the plurality of mobile stations, wherein the operating mode comprises either a point-to-point (PTP) operating mode or a PTM operating mode,
internally generating an indication that a first period of time has passed without receiving a complaint message from a mobile station of the plurality of mobile stations, or
internally generating an indication that a second period of time has passed without receiving a request message from the mobile station of the plurality of mobile stations.

16. A method according to claim 14, further comprising:
generating a signal for a mobile station of the plurality of mobile stations, in response to processing of the event, to switch between a point-to-point (PTP) operating mode and a PTM operating mode, and communicating the signal to the mobile station.

17. A method according to claim 16, when the event comprises either a complaint message from the mobile station, or a request message from the mobile station to change an operating mode of the mobile station between the PTP operating mode and the PTM operating mode, and wherein the step of generating an signal for a mobile station, in response to processing of the event, to switch between a PTP operating mode and a PTM operating mode, and communicating the signal to the mobile station, comprises:
- determining, at the controller, whether a particular mobile station is operating in the PTM operating mode;
- when the controller determines that the particular mobile station is operating in the PTM operating mode:
  - determining, at the controller, whether the particular mobile station is to be switched from the PTM operating mode to the PTP operating mode; and
  - when the controller determines that the particular mobile station is to be switched from the PTM operating mode to the PTP operating mode:
    - transmitting, from the controller to the particular mobile station, a signal for the particular mobile station to switch to the PTP operating mode.

18. A method according to claim 17, when the controller determines that the particular mobile station is not operating in the PTM operating mode, wherein the step of generating a signal for a mobile station, in response to processing of the event, to switch between a PTP operating mode and a PTM operating mode, and communicating the signal to the mobile station, comprises:
- determining, at the controller, whether the event is a request message from the mobile station to switch the operating mode of the mobile station to the PTM operating mode; and
- when the controller determines that the event is a request message from the mobile station to switch the operating mode of the mobile station to the PTM operating mode:
  - transmitting, from the controller to the particular mobile station, a signal for the particular mobile station to switch to the PTM operating mode.

19. A system for distributing content to a plurality of mobile stations, the system comprising:
- a controller residing above a core network and that is designed to process events, wherein the core network resides above a radio access network comprising one or more base stations and wherein the controller is designed to determine whether a current modulation-and-coding scheme (MCS) level applied to downlink transmissions over a downlink point-to-multipoint (PTM) bearer is to be changed or maintained, and to communicate a change message whenever the current MCS level is to be changed; and
- an actuator implemented by an infrastructure device of the core network and that is designed to adjust, in response to receiving a change message from the controller, a MCS level that is applied to downlink transmissions to the plurality of mobile stations over the downlink PTM bearer.

20. The system according to claim 19, wherein each change message comprises either an increment message, or a decrement message, wherein the decrement message instructs the actuator to decrease the MCS level that is applied to the downlink transmissions over the downlink PTM bearer, and wherein the increment message instructs the actuator to increase the MCS level that is being applied to the downlink transmissions over the downlink PTM bearer, and
- wherein the controller is designed to communicate a decrement message when the controller determines that the current MCS level is to be decremented, and wherein the actuator is designed to decrease the MCS level that is being applied to the downlink transmissions over the downlink PTM bearer in response to the decrement message, and
- wherein the controller is designed to communicate an increment message when the controller determines that the current MCS level is to be incremented, and wherein the actuator is designed to increase the MCS level that is being applied to the downlink transmissions over the downlink PTM bearer.

21. A system according to claim 19, wherein the system further comprises:
- a plurality of mobile stations, and
- wherein the event processed at the controller comprises one or more of:
  - reception of a complaint message from any mobile station,
  - reception of a request message from any mobile station to change the operating mode of that particular mobile station, wherein the operating mode comprises either the point-to-point (PTP) operating mode or the point-to-multipoint (PTM) operating mode,
  - an indicator internally generated by the controller when a first period of time has passed without receiving a complaint message from any mobile station, or
  - an indicator internally generated by the controller when a second period of time has passed without receiving a request message from any mobile station.

22. A system according to claim 19, further comprising:
- a plurality of mobile stations, wherein each of the mobile stations is designed to determine whether reception of the information over the downlink PTM bearer is inadequate, and to send, when the mobile station determines that the reception of information over the downlink PTM bearer is inadequate, at least one of:
  - a complaint message to the controller; and
  - a request message to the controller to switch to a point-to-point (PTP) operating mode.

23. An actuator implemented by an infrastructure device of a core network and designed to adjust a modulation-and-coding scheme (MCS) level that is applied to downlink transmissions to a plurality of mobile stations over a downlink point-to-multipoint (PTM) bearer, wherein the core network resides above a radio access network comprising one or more base stations, the actuator comprising:
- a processor and a memory operatively coupled with the processor, the processor designed to:
  - receive a change message from a controller residing above the core network, the change message comprising either an increment message or a decrement message;
  - decrease the current MCS level by a decrement amount when the received change message is a decrement message and the current MCS level is above a minimum threshold, and apply a MCS at a decremented MCS level to the downlink PTM bearer; and
  - increase the current MCS level by an increment amount when the received change message is the increment message and the current MCS level is below a maximum threshold, and apply a MCS at an incremented MCS level to the downlink PTM bearer.

24. A controller implemented by a device residing above a core network, wherein the core network resides above a radio access network comprising one or more base stations, comprising:
- a processor and a memory operatively coupled with the processor, the processor designed to process an event, to determine based on the event, whether a current MCS level applied to downlink transmissions to a plurality of mobile stations over a downlink point-to-multipoint (PTM) bearer is to be incremented, decremented or maintained, to generate a decrement message when the controller determines that the current MCS level is to be decremented, and to generate an increment message when the controller determines that the current MCS level is to be incremented, a transmitter designed to communicate the decrement message or the increment message to an actuator implemented by an infrastructure device of the core network.

25. A controller according to claim 24, wherein the decrement message instructs the actuator to decrement the current MCS level that is being applied to downlink transmissions over the downlink PTM bearer, wherein the increment message instructs the actuator to increment the current MCS level that is being applied to downlink transmissions over the downlink PTM bearer.

26. A controller according to claim 24, wherein the event comprises one of:

receiving a complaint message from a mobile station of the plurality of mobile stations, receiving a request message from a mobile station of the plurality of mobile stations to change an operating mode of the mobile station, wherein the operating mode comprises either a point-to-point (PTP) operating mode or a PTM operating mode, internally generating an indication that a first period of time has passed without receiving a complaint message from a mobile station of the plurality of mobile stations, or internally generating an indication that a second period of time has passed without receiving a request message from a mobile station of the plurality of mobile stations.

27. A controller according to claim 24, wherein the processor is further designed to generate a signal for a mobile station of the plurality of mobile stations, in response to processing of the event, to switch between a point-to-point (PTP) operating mode and a PTM operating mode, and wherein the transmitter is further designed to communicate the signal to the mobile station.

28. A controller according to claim 27, when the event comprises either receiving a complaint message from the mobile station, or receiving a request message from the mobile station to change an operating mode of the mobile station between the point-to-multipoint (PTM) operating mode or the PTM operating mode, wherein the processor is further designed to determine whether a particular mobile station is operating in the PTM operating mode, and when the processor determines that the particular mobile station is determined to be operating in the PTM operating mode, wherein the processor is further designed to determine whether the particular mobile station is to be switched from the PTM operating mode to the PTP operating mode, and when the processor determines that the particular mobile station is to be switched from the PTM operating mode to the PTP operating mode, wherein the processor is further designed to generate a signal that includes a signal for the particular mobile station to switch to the PTP operating mode, and wherein the transmitter is designed to transmit the signal to the particular mobile station.

29. A controller according to claim 28, when the processor determines that the particular mobile station is not operating in the PTM operating mode, wherein the processor is further designed to determine whether the event is the reception of a request message from the mobile station to switch the operating mode of the mobile station to the PTM operating mode, and when the processor determines that the event is the reception of the request message from the mobile station to switch the operating mode of the mobile station to the PTM operating mode, wherein the processor is further designed to generate a signal that includes a signal for the particular mobile station to switch to the PTM operating mode, and wherein the transmitter is designed to transmit the signal to the particular mobile station.

* * * * *

UNITED STATES PATENT AND TRADEMARK OFFICE
CERTIFICATE OF CORRECTION

PATENT NO. : 8,867,388 B2  
APPLICATION NO. : 13/300563  
DATED : October 21, 2014  
INVENTOR(S) : Donald G. Newberg et al.

Page 1 of 1

It is certified that error appears in the above-identified patent and that said Letters Patent is hereby corrected as shown below:

ON THE TITLE PAGE ITEM 56:

Page 2, under "OTHER PUBLICATIONS," in Column 1, Line 11, delete "mailed mailed May" and insert -- mailed May --, therefor.

Page 2, under "OTHER PUBLICATIONS," in Column 2, Line 13, delete "Netowrks,"" and insert -- Networks," --, therefor.

Page 2, under "OTHER PUBLICATIONS," in Column 2, Line 54, delete ""OMA-TS-PoC_MUL TICAST" and insert -- "OMA-TS-PoC_MULTICAST --, therefor.

Page 2, under "OTHER PUBLICATIONS", in Column 2, Line 57, delete "OMA-TS-PoC_ControiPiane-V1_0_3-20090922-A," and insert -- OMA-TS-PoC_ControlPlane-V1_0_3-20090922-A, --, therefor.

Page 2, under "OTHER PUBLICATIONS," in Column 2, Line 60, delete "OMA-TS-PoC_UserPiane-V1_0_3-20090922-A," and insert -- OMA-TS-PoC_UserPlane-V1_0_3-20090922-A," --, therefor.

IN THE SPECIFICATION:

In Column 6, Line 30, delete "server 160" and insert -- server 260 --, therefor.

In Column 12, Lines 56-57, delete "MBMS GW 210" and insert -- MBMS GW 211 --, therefor.

In Column 12, Line 61, delete "MBMS GW 210" and insert -- MBMS GW 211 --, therefor.

In Column 13, Lines 47-48, delete "PDN GW 218" and insert -- PDN GW 216 --, therefor.

Signed and Sealed this  
Twenty-fourth Day of May, 2016

Michelle K. Lee  
*Director of the United States Patent and Trademark Office*